United States Patent [19]

Börner et al.

[11] Patent Number: 4,799,749

[45] Date of Patent: Jan. 24, 1989

[54] INTEGRATED RESONATOR MATRIX FOR WAVELENGTH-SELECTIVE SEPARATION OR JOINING OF CHANNELS IN THE FREQUENCY DOMAIN OF OPTICAL COMMUNICATIONS TECHNOLOGY

[75] Inventors: Manfred Börner, Ulm; Reinhard Müller, Ingolstadt; Gert Trommer, Munich, all of Fed. Rep. of Germany

[73] Assignee: Siemens Aktiengesellschaft, Berlin and Munich, Fed. Rep. of Germany

[21] Appl. No.: 924,848

[22] PCT Filed: Feb. 25, 1986

[86] PCT No.: PCT/DE86/00069

§ 371 Date: Oct. 14, 1986

§ 102(e) Date: Oct. 14, 1986

[87] PCT Pub. No. WO86/04999

PCT Pub. Date Aug. 28, 1986

[30] Foreign Application Priority Data

Feb. 25, 1985 [DE] Fed. Rep. of Germany ....... 3506569

[51] Int. Cl.⁴ ................................................ G02B 6/10
[52] U.S. Cl. ............................. 350/96.13; 350/96.15; 350/96.14
[58] Field of Search ............... 350/96.13, 96.14, 96.15; 370/1, 3; 455/612

[56] References Cited

U.S. PATENT DOCUMENTS

| | | | |
|---|---|---|---|
| 4,592,043 | 5/1986 | Williams | 350/96.15 X |
| 4,616,898 | 10/1986 | Hicks, Jr. | 455/612 X |
| 4,665,421 | 5/1987 | Borner et al. | 357/30 |

FOREIGN PATENT DOCUMENTS

| | | |
|---|---|---|
| 3205461 | 9/1983 | Fed. Rep. of Germany . |
| 3227682 | 2/1984 | Fed. Rep. of Germany . |
| 3227683 | 2/1984 | Fed. Rep. of Germany . |

*Primary Examiner*—Paul Gensler
*Attorney, Agent, or Firm*—Hill, Van Santen, Steadman & Simpson

[57] ABSTRACT

Integrated resonator matrix for wavelength-selective separation or joining of channels in the frequency domain of optical communications technology.

Arrangement of optical resonators which are composed of dielectric waveguides which are mirrored at their ends predominantly with reflectors having high reflection factors close to the value one and whose longitudinal extent between the reflectors is great in comparison to the transverse dimensions perpendicular thereto, all optical resonators are integrated such on a substrate to form a matrix-like arrangement, referred to as resonator matrix. Two types of resonators can be distinguished, whereby the resonators of the first type are highly coupled to one another and act as coupled resonators (22, 221, 222), whereas the resonators of the second type act as wavelength-selective useful resonators (23, 231, 232) and, compared to the couplings between the resonators of the first type, are weakly coupled to one another or, respectively, to the resonators of the first type and form at least two useful resonator groups which are not coupled to one another (or are coupled to one another as little as possible) whereby a useful resonator group contains one or more useful resonators.

48 Claims, 14 Drawing Sheets

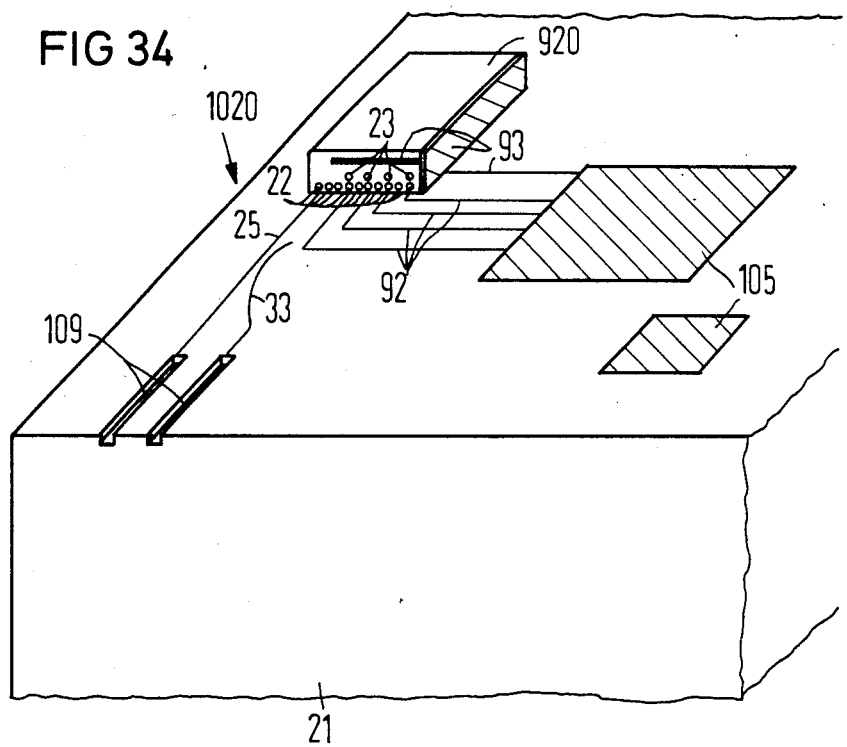

INTEGRATED RESONATOR MATRIX FOR WAVELENGTH-SELECTIVE SEPARATION OR JOINING OF CHANNELS IN THE FREQUENCY DOMAIN OF OPTICAL COMMUNICATIONS TECHNOLOGY

The present invention relates to a resonator matrix whose individual resonators are composed of dielectric waveguides mirrored at their end faces and which are integrated such on a substrate that the resonators are optically coupled to different degrees within various levels and between various levels and which meets the object of separating and/or joining a plurality of modulated and unmodulated carriers in the frequency domain of optical communications technology in wavelength-selective fashion. Specific embodiments of the resonator matrix allow the channels in the arrangement in which they are separated and/or joined to also be modulated or to be amplified as well or to also be demodulated and/or converted into electrical signals. Auxiliary electronic circuits and/or further optical elements, for example, further resonator matrices as well, can also be integrated on the same semiconductor substrate as the resonator matrix.

The field of employment of the resonator matrix shall first be set forth:

As a result of the increasing need for transmission bandwidth in cable connections, particularly with the anticipated TV transmission technology, it is appropriate to develop devices which make far more than the present bandwidth of about 1 GHz available on a single glass fiber. Because of the difficulties of processing more than 1 GHz in the semiconductor circuits, proposals have already been made to transmit more than one carrier frequency. When the carriers then lie far apart, for example at 0.85 μm which corresponds to the wavelength of a gallium aluminum-arsenide laser, and at 1.3 μm which corresponds to the wavelength of an indium-phosphide laser, then both frequencies cannot be simultaneously intermediately amplified by a single laser amplifier in the course of the glass fiber cable.

It has therefore already been proposed that the carriers be placed in tight proximity within the relatively small bandwidth of the single laser amplifier. These laser amplifiers, for example a semiconductor injection laser of indium phosphide, can still simultaneously amplify frequency bands of about $10^{14} Hz \cdot 10^{-3} = 100$ GHz despite a very small relative bandwidth of about $10^{-3}$.

There are also proposals for the demodulation. As a result of the lower power consumption per channel, the heterodyne methods or homodyne methods known from radio-frequency technology lie at hand, i.e., methods which work with a corresponding carrier addition in a photodiode. In accord with German patent application No. P 32 05 461.0-33, such a photodiode would be advantageously combined with a selective resonator.

Given the inventive realization of the method of modulation and demodulation of many light carriers in very narrow frequency bands to be set forth below, the following situation is also noteworthy:

For stability and cost reasons, the realization of the said optical elements requires a compression of the "light circuit" to the optimally smallest space. For coupling reasons, the appertaining electronic selection and control elements should also have a closely proximate relationship to the "light circuit". A tight, monolithic electro-optical integration which has likewise already been proposed in the literature therefore seems appropriate.

Whereas, however, there have hitherto at least been incomplete proposals for manufacturing the receiver on silicon as base material, there is a practically complete lack of ideas for the realization of a wavelength-selective modulator for many tightly adjacent carriers in the wavelength domain of optical communications technology together with drive circuit. That can be substantiated as follows: Up to now, the modulation has been very successfully realized with the assistance of the injection current in semiconductor lasers. At the same time, that was a very efficient integration of transmitter and modulator. An optical communications transmission system comprising many closely proximate channels which preferably functions with heterodyne or homodyne method, however, raises higher demands with respect to the frequency stability and the narrow-bandedness of the laser lines than could be met by the modulation methods hitherto predominantly practiced. It is therefore appropriate to re-think the concept of the modulation.

This intent becomes compelling due to the following argument: It is known from radio-frequency technology that extremely frequency-stable oscillators should best not be directly modulated. The modulation should more appropriately be carried out in a modulator separate from the oscillator. This situation is no longer valid at light frequencies: The frequency stability of the coherent, monochromatic light source should, insofar as possible, noticeably amount to less than 1 MHz, better a few kHz. This thus corresponds to a relative stability of about $10^{-8} \ldots 10^{-11}$ of every frequency to be modulated. As already proposed (see reference 1), only one mother oscillator should then be preferably responsible for the overall carrier offering given coherently optical transmission methods in a transmission system and, for example, should be co-transmitted as unmodulated carrier, for example, in a special monomode glass fiber.

Given this special system of simultaneous transmission of many closely proximate carriers based on a coherently optical homodyne or heterodyne method, thus, the following noteworthy conception derives, this, however, only being technically and economically realizable by means of the inventive solution of the monolithic opto-electronic integration of the modulators, of the repeaters with and without regeneration, of the potentially computer-controlled branchers and of the receivers with selective demodulation:

1. The oscillator and light transmitter is unmodulated. All involved exertions are undertaken in order to keep it stable. Since it only occurs a few times in the transmission system, that is likewise not a prohibitive cost factor. The individual carriers lying, for example, at a spacing of 4–15 GHz can, for example, be generated as longitudinal modes of a single laser resonator.

2. The modulator only has the job of modulating a specific frequency of the laser transmitter which is otherwise not disturbed by it. The material of the modulator, thus, need not necessarily be a direct semiconductor. The employment of an insulator known from microwave technology between laser and modulator is advantageous (see reference 12).

3. As a consequence of the now allowable employment of silicon for the modulator, the inventive exploitation of this material is of high technical value, since the simultaneous integration of electro-optical properties and electronic properties on a silicon chip is thus enabled.

4. An arrangement similar to the modulator can serve as detector for the wavelength-selective conversion of a plurality of channels into electric signals.

5. A structure similar to that in 4, without demodulator, can be employed for wavelength-selective branching.

6. The branchings can either be "passive" and permanently set or can contain a demultiplexer which makes the electronic channels accessible for a computer-controlled switching.

The system to be realized, this to be enabled by the realization of its basic components in accord with the invention and to be set forth below, would have the form sketched in FIG. 1. It contains the basic components transmitter 10, isolator 11, modulator 12, repeater/regenerator 13, brancher or collector 14, demodulator/receiver 15 as well as glass fiber lines 16. The polarization level of the light must be potentially matched with known means of light-processing basic components. Polarization-preserving fibers are thereby advantageous.

At least one of the two, following basic jobs occurs in the basic components coupler, modulator, repeater/regenerator, brancher, collector, demodulator/receiver:

1. Wavelength-selective combination of a plurality of channels incoming at the input side on different electrical and/or optical lines onto a single optical line at the output side=multiplexing.

2. Wavelength-selective separation of a plurality of channels incoming at the input side on a single optical line onto various optical and/or electrical lines at the output side=demultiplexing.

These two basic jobs can then be resolved by a resonator matrix of the invention which shall then also be referred to below as "1—N-coupler of the invention".

This element is composed of a single resonator matrix which is in the position to separate a plurality of optical channels, even all optical channels in wavelength-selective fashion and to couple them into and/or divide them onto various outgoing optical lines. Then, this 1—N—coupler is referred to as "passive brancher" or also as "brancher of the invention". The passive brancher can also be operated in the opposite direction as an optically reciprocal element which is then referred to as "collector of the invention".

Over and above the two basic jobs set forth above, a single matrix arrangement of resonators is also in the position of separating a plurality of optical channels, even all optical channels in wavelength-selective fashion, of separately modulating them and of again optically recombining these channels onto a line. Then, the matrix arrangement is referred to below as "modulator of the invention".

Further, a single resonator matrix is also in the position of separating a plurality of optical channels, all optical channels as well in wavelength-selective fashion and of converting them into electrical signals which are further electrically processed on separate lines. This can ensue by means of an electronics integrated on the same chip. Then, the matrix arrangement is referred to below as "demodulator/receiver of the invention".

Further, a combination of resonator matrices is in the position of separating a plurality of optical channels, all optical channels as well in wavelength-selective fashion and converting them into electrical signals which are further processed on separate electrical lines in that, potentially following regeneration of the electrical pulses, the electrical channels controlled, for example, by an exchange computer are supplied in arbitrary allocation to the modulators of different, out-going optical lines. Then, the matrix arrangement is referred to below as "computer-controlled brancher of the invention".

A single matrix arrangement can also be employed to separate a plurality of optical channels, all optical channels as well in wavelength-selective fashion, to separately optically amplify them and to again re-combine the amplified channels. Then, it is referred to as "repeater of the invention".

Figure 33:
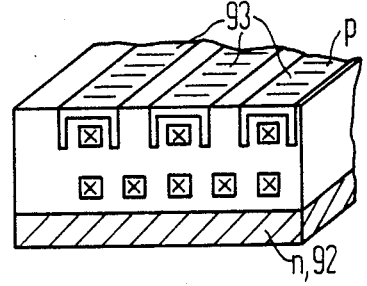
Figure 29:
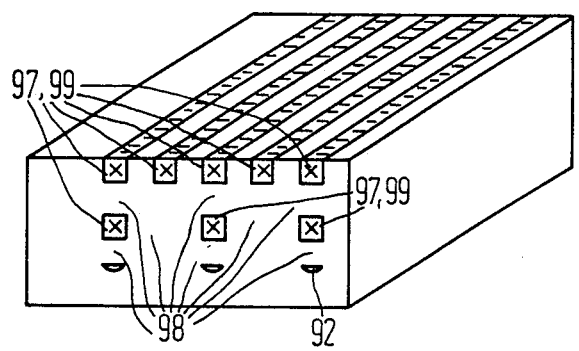
FIG. 29 illustrates the alternate filling of the grooves.
Figure 30:
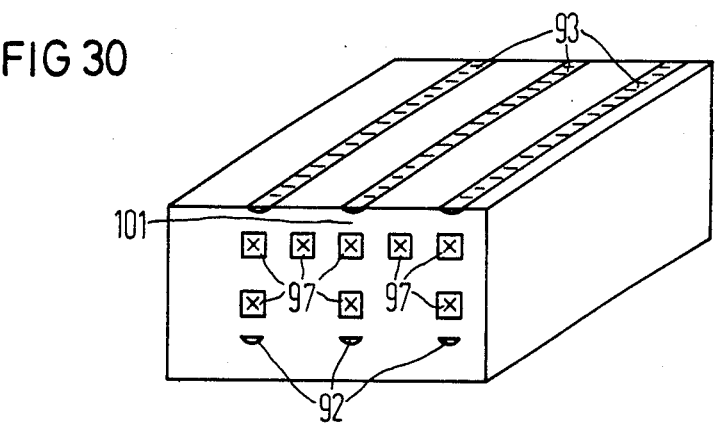
FIG. 30 illustrates the application of a cover layer of pure silicon and upper contacts.
Figure 35:
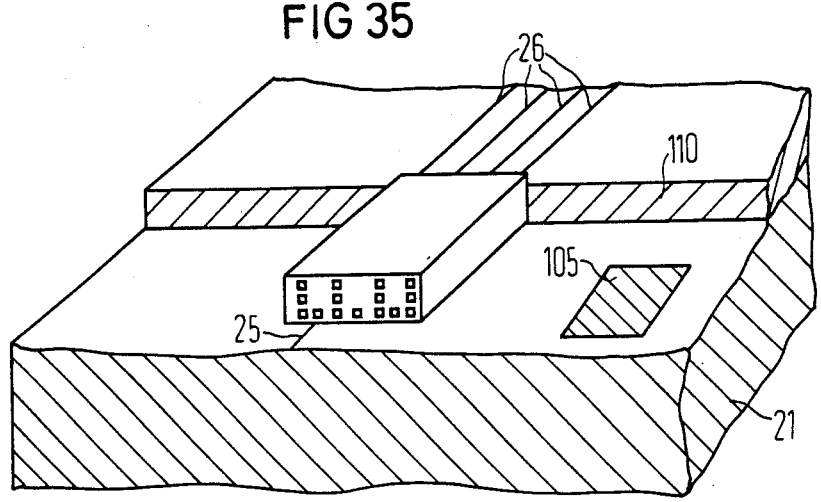
Figure 36:
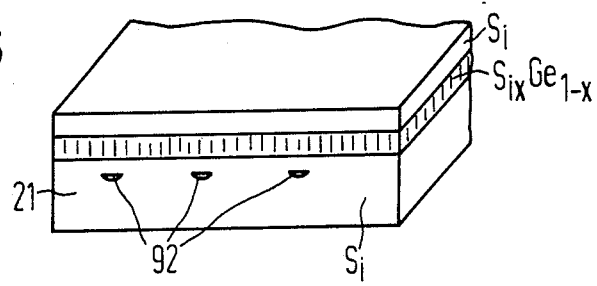
Figure 37:
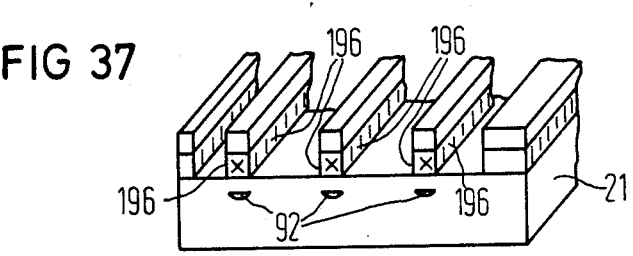
Figure 38:
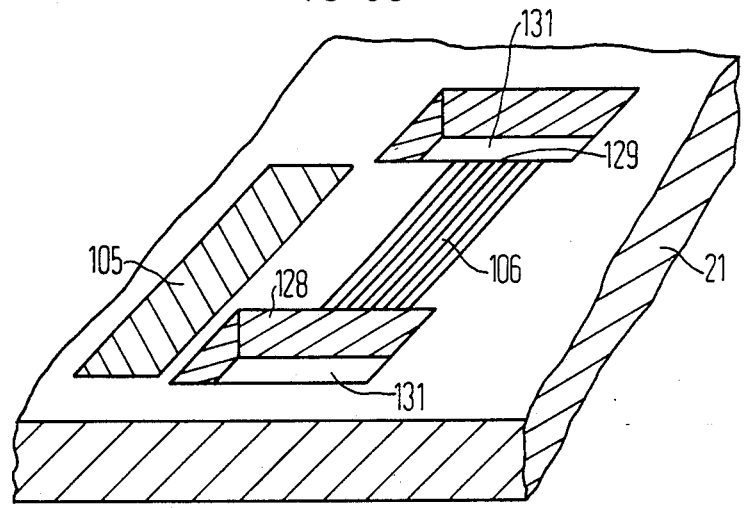
Figure 39:
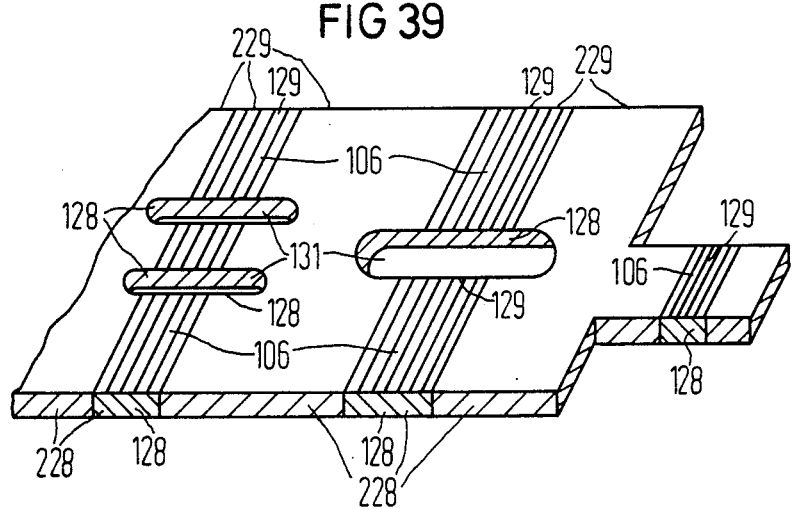
Figure 40:
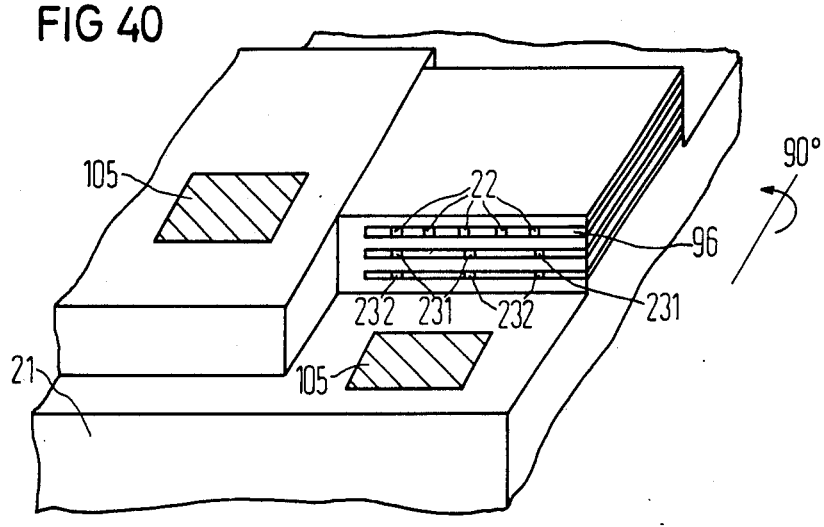
Figure 41:
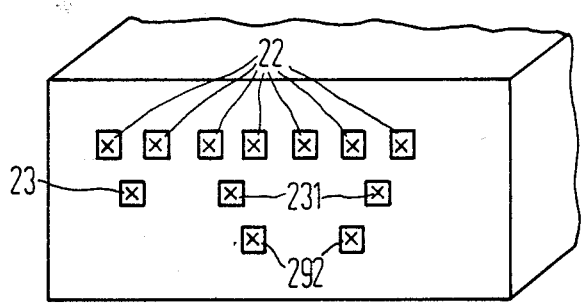
Figure 42:
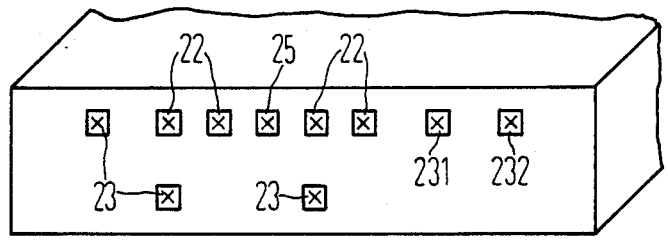

FIG. 33 also illustrates that the contacts can be constructed in a U-shaped form;

FIG. 34 illustrates a structure in which the electrical connection of the contacts formed in a planar level which contains the lower contacts and, perhaps, integrated electronics, can occur by filling a groove with n-conductive material;

FIG. 35 illustrates that the growth of material and the etching and filling of the grooves can be undertaken in a plurality of successive steps on a level-by-level basis;

FIG. 36 illustrates the provision of a plurality of successive layers of Si, $Si_xGe_{1-x}$ that can be grown on a substrate;

FIG. 37 illustrates the subsequent etching of the grooves in the structure of FIG. 36;

FIG. 38 illustrates that only the end faces must be exposed for mirroring;

FIG. 39 illustrates that when the etched holes are sufficiently large that even rounded corners arise in anisotropic etching and not disturbing;

FIG. 40 illustrates that the etching of the grooves and the other manufacturing steps in the above examples occur perpendicular to the various resonator levels and the manufacturing steps can also occur parallel to the resonator levels in the substrate which is rotated by 90°;

FIG. 41 illustrates that the useful resonators can also be arranged offset between coupled resonators and/or two weakly coupled useful resonators of two neighboring levels and can be arranged offset; and FIG. 42 illustrates a coupled resonator level which is defined by coupled resonators and can contain useful resonators at one/or the other and of the level.

Figure 1:
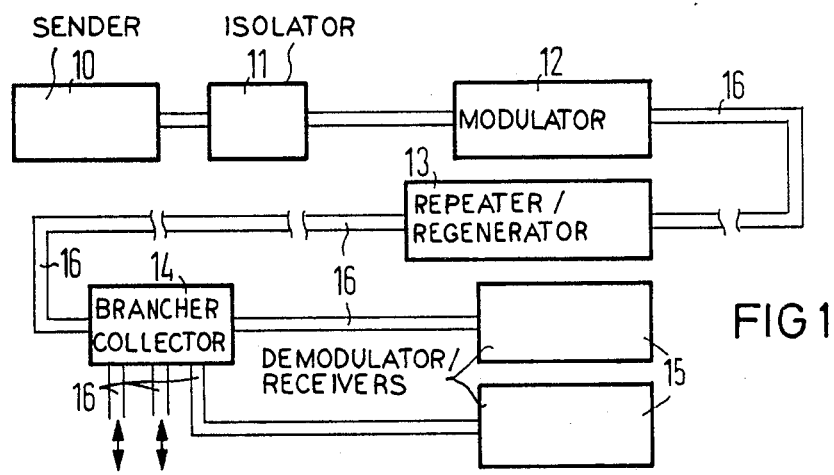
FIG. 1 is a schematic reprsentation of a system employing the present invention.

Our invention—a resonator matrix which is integrated such on a substrate that the resonators are coupled to different degrees within various levels and between various levels and which can separate and/or join a plurality of modulated or unmodulated carriers in the frequency domain of optical communications technology in wavelength-selective fashion—achieves the two, aforementioned basic jobs and provides solutions for the basis components of the overall communications transmission system sketch in FIG. 1, as shown in the following examples. By way of example, a few uses of the optical and/or elector-optical integrated components modified from a resonator matrix are set forth. Dependent on the job, known electro-optical elements can be co-integrated or employed with a new structure of the invention in addition to resonator matrices of the invention.

Example (1)

Modulator of the system, realized by modulator of the invention.

Example (2)

Modulator of the system, realized by the following elements (a) through (c):
(a) Device for separating the carriers, realized by brancher of the invention.
(b) N modulators which operate in accord with known principles, for example in accord with the electro-optical effect.
(c) Device for joining the modulated carriers, realized by collector of the invention.

Example (3)

Carrier generation and modulation of the carriers given a plurality of different laser oscillators: joining of the carriers by collectors of the invention and following modulator of the invention.

Example (4)

Carrier generation and modulation of the carriers given a plurality of different laser oscillators, second alternative: separate modulating with N modulators which operate on known principles and subsequent joining of the modulated carriers by collector of the invention.

Example (5)

Receiver/demodulator of the system, realized by demodulator/receiver of the invention.

Example (6)

Receiver/demodulator of the system realized by the passive brancher of the invention with following, traditional photodiodes, for example manufactured of pure Si and/or $Si_xGe_{1-x}$ (see reference 2)

Example (7)

Repeater with regenerator in the system, composed of the following elements (a) through (d):
(a) (Receiver/demodulator of the system of Example 5 or 6.
(b) Electronic circuit for regenerating the electrical signals.
(c) Apparatus for optical amplification of the transmitted, unmodulated carriers.
(d) Modulator of the system in accord with Example 1 or 2 for modulating the amplified carriers with regenerated electrical signals.

Example (8)

Exchange of the system, realized by computer controlled branchers of the invention.

In the cited Examples 1 through 8, the resonator matrix of the invention appears in different garb with different jobs, this resonator matrix of the invention to be set forth below.

Figure 2:
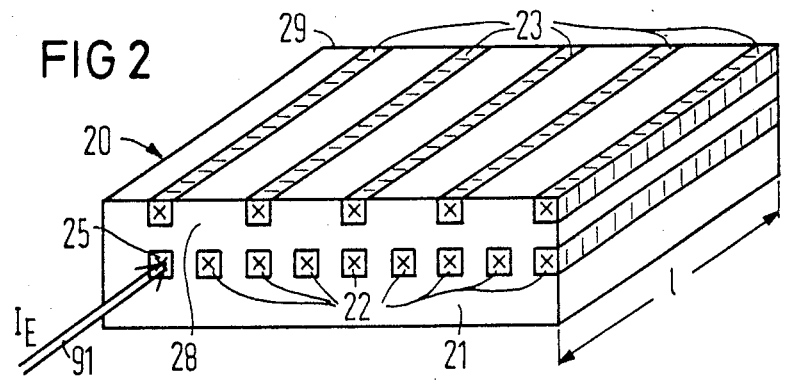
FIG. 2 illustrates the basisc structure of a matrix which has a substrate of, for example, silicon.

FIG. 2 shows the fundamental structure of this matrix. The overall matrix 20 has a substrate 21 as base composed, for example, of super-pure silicon. Optical resonators and 23 are arranged thereabove always on at least 2 levels. An individual resonator 22 and 23 is thereby composed of a multimode or, preferably, single-mode dielectric waveguide whose end faces are mirrored. The application of the resonators always ensues matrix-like, i.e. the resonators are not only planarly arranged in a level or curved surface but are arranged such that at least one narrow-banded resonator lies outside of the first level or curved surface which is erected by the other resonators or a part of the other resonators.

Dependent on the task, the resonators should either be greatly coupled or weakly or optimally slightly coupled, i.e. best of all not optically coupled to the neighboring resonators, this being carried out by the different geometrical spacing and/or by modified refractive index of the intervening medium. A resonator matrix thus always contains resonators which are highly coupled to one another and, in this context, referred to as coupled resonators 22, 221 and 222 as well in later examples, and it always contains resonators which, on the one hand, are weakly coupled to other resonators or, on the other hand, are not coupled to other resonators, i.e. are coupled thereto as little as possible, and which, in this context, are referred- to-.as useful resonators 23, 231 and 232 as well in later examples. As in the example of FIG. 2, these resonators are arranged in different levels, whereby every level preferably contains either only useful or coupled resonators. The matrix 20 of FIG. 2, for example, contains only two levels of resonators which are arranged on top of one another. A resonator matrix can also contain more than two levels such as, for example, in the examples of FIGS. 10, 11 or of FIGS. 19 to 21 which shall be set forth later. The optimally low coupling is achieved in that the spacings of the useful resonators from one another are selected large. A useful resonator 23 therefore does not lie above every coupled resonator 22 in FIG. 2. Herein, for example, a further useful resonator 23 only lies again over the second neighboring coupled resonator 22, but can also lie only over the third or fourth, see, for example, FIG. 11. When the useful and coupled resonators are separated according to levels, two neighboring resonators which lie in- two different but neighboring levels are weakly coupled to one another. The precise value of the coupling, however, then need not be identical between all levels. The couplings in every level and from level to level and, thus, the spacings of the resonators can be optimized. This is true both with respect to their function ability, such as bandwidth and efficiency, as well as with respect to the simplicity of manufacture. This includes the boundary case connected with many disadvantages with respect to the functioning that the coupled resonators of one level grow together to form a plate.

The coupled resonators 22 have the job of distributing the energy in the overall bandwidth of the overall signal in the coupled resonator level and, thus, have great coupling. The individual useful resonators 23 have the job of influencing the light in wavelength-selective fashion and therefore have the least possible coupling to one another. Due, namely, to the weak coupling of a useful.- resonator to the resonator of a neighboring adjacent to it, light of one- wavelength is then only coupled over into the latter when the useful resonator is in resonance for this wavelength. Its bandwidth and, thus, its coupling to a coupled resonator should only correspond to the bandwidth of a sub-signal.

In the various Figures, 28 is the front side and 29 is the back side of the resonator matrix which, with the potential exception of the coupling-in and/or coupling-out waveguides, can be mirrored as a unit, for example, by applying optical layers, in order to achieve a high resonant quality.

Waveguides which only couple light into the overall resonator matrix are referenced 25 in the Figures; waveguides which only couple light out are referenced 26; and waveguides which couple light in and out are referenced 27.

A significant advantage of the distribution of the energy over three-dimensionally spread regions of the arrangement by coupled resonators and their designational, wavelength-selective concentration onto a few desired regions of this arrangement in the useful resonators is comprised therein that it is based on the coupling of strictly parallel waveguides and not, for instance, on the crossed or curved arrangement of waveguides and resonators. It is only by so doing that light losses can be effectively prevented and a wavelength-selective $1-N-$separation or, respectively, joining of the energies can be executed with an extremely high efficiency.

Figure 3:
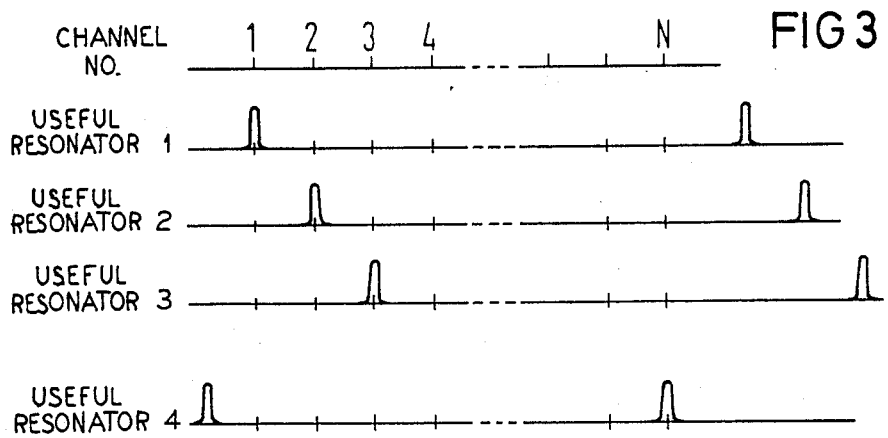
FIG. 3 is a graphic illustration of the wavelength-selective operation of a resonator matrix which is based on the fact that energy is distributed onto the useful resonators by the coupled resonators.

The wavelength-selective functioning of a resonator matrix is always based on the fact that the energy is distributed onto the useful resonators by the coupled resonators and the useful resonators such as, for example, in accord with FIG. 3 are matched to the individual channels.

It is important that, in most applications, a resonance of a useful resonator is matched to a channel and that further resonances of the same useful resonator do not coincide with other channels. When, namely, the resonator is many wavelengths $\lambda_1$ long, for example $1 = n \cdot \lambda_1/2$ then resonance can occur again at a wavelength $\lambda_2$, for example at $(n+1) \cdot \lambda_2/2$. The further resonances of the useful resonator can lie outside of the N channels, as in FIG. 3, or in the intermediate region between two channels. For some applications as mentioned, for example, given a push-pull modulator, it is also important that two or more useful resonators can be tuned to one wavelength. The useful resonators influence the individual channels wavelength-selectively in that they absorb the light of the appertaining channel, amplify it and couple it over into a further waveguide, etc.

The useful resonators of channels neighboring one another in terms of wavelength also preferably lie geometrically next to one another, but this is not absolutely necessary for the functioning.

For many applications, the resonant wavelengths of the individual coupled resonators of a resonator matrix can be tuned to a wavelength which, for example, lies in the center of the carrier wavelengths to be influenced. For some applications, it can also be favorable to tune the individual coupled resonators to different wavelengths, for example to wavelengths which rise or fall in a systematic way.

FIG. 2 shows a first arrangement 20 of a resonator matrix comprising coupled resonators 22 placed in a lower level and comprising a level of useful resonators 23 placed thereabove. The desired wavelength-selection occurs decisively via the set resonances of the useful resonators. Shown is a light beam 91 having the intensity $I_E$ that is to be coupled into the waveguide 25.

These optical resonators are generated by waveguide structures 22 and 23 embedded in the substrate 21, produced by an elevated refractive index in comparison to the substrate, and the reflectors 28 and 29 at the two end faces of the waveguides.

The resonators are thus composed of dielectric waveguides mirrored at the end faces which, in this context, are also referenced as such when mobile and/or stationary charges are present in the semiconductor and, thus, no pure non-conductor is present.

The coupled resonators function on the following principle: When a resonator is weakly coupled by waveguide coupling to a waveguide which proceeds parallel to it, then it will only have a slight influence on the light in the waveguide when it is not in resonance. Only given resonance do the partial waves which run back and forth in the resonator yield a wave field having high amplitudes due to constructive interference in the resonator. This wave field is partly coupled back into the parallel waveguide and interferes with the field of the waveguide. In the case of -resonance, the field radiated into the waveguide can be largely cancelled in this way and a reflected wave can be generated. The coupling of two parallel resonators is based on a corresponding effect.

The peak signals illustrated in FIG. 3 show exactly which useful resonator is excited at which channel. In channel No. 1, it is the first useful resonator, at channel No. 2, it is the second useful resonator, etc.

In the German application papers P No. 32 27 683.4 and P No. 32 27 682.6 for the serial arrangement of absorption resonators, the light is not coupled in in parallel as just set forth above but, rather, is coupled into following resonators straight through the mirrors of high quality resonators. Since the resonators for the required high quality must have reflection factors close to 1 and such mirrors comprise high losses of the transmitted energy, a great deal of energy which should proceed into the following resonators is lost in the mirrors. A parallel arrangement of resonators avoids this serious disadvantage.

Since the energy in the resonator matrices is not coupled into the individual resonators straight through the mirrored end faces of the resonators but is coupled in in parallel via the waveguide structure, it is favorable for the functioning of the resonator structure, even essential, that all useful and coupled resonators 22, 23, 221, 222, 231, 232 under discussion are mirrored with reflectors which exhibit high reflection factors in the proximity of 1 but which, however, need not be trans-irradiated. Only the in-coupling waveguides and/or out-coupling waveguides in the various Figures which are referenced 25, 26 and 27 need not be mirrored. These waveguides 25, 26 or 27, however, can be mirrored on one side with mirrors having high reflection factors, for example given the 1−N coupler, or can be mirrored at both sides with mirrors not having such high reflection factors, so that, in contrast to the useful and coupled resonators, they form only extremely broad-banded resonators. The elements 25, 26 and 27 are therefore not addressed as-resonators in this context but are always addressed as in-coupling and/or out-coupling waveguides. Broad-banded resonators have mirrors having low reflection factors; transmission losses therefore play no part in them.

In-coupling and/or out-coupling waveguides which are first intended to couple light into or out of one level of coupled resonators such as, for example, in FIG. 2 can also be arranged outside of the level of the coupled resonators 22, i.e. above or below the level of the coupled resonators; however, they must be highly coupled to one of the coupled resonators and must proceed essentially parallel to it.

The resonant wavelength of the individual resonator is defined by the optical path of the waveguide forming it. A designational setting of a resonator to a desired resonant wavelength therefore ensues via an appropriately to be adjusted length of the optical path $l_{opt}$ which is defined by $l_{opt} = n_{eff} l$; $n_{eff}$ is the effective refractive index of the waveguide $n_{eff} = \beta/k$ defined by the phase constant $\beta$ and by the vacuum wave number k; l is the geometric length of the resonator. An influencing of $l_{opt}$ can therefore ensue either via the selection of the geometrical length of the resonator or via its effective refractive index. A possibility for setting the resonators of the resonator matrix to the desired, different resonant wavelengths is the intentional oblique positioning of the mirrored end faces 28 and 29 relative to one another, this arising in that the angles $\gamma$ and/or $\phi$ in FIG. 9 assume values unequal to 90°. The resonators 22 and 23 are tuned to different resonant wavelengths on the basis of the respectively different resonator lengths 1 whose differing dimension for each of the resonators derives from the oblique position of the reflectors 28 and 29. Such a tuning is a measure that is relatively simple to realize technologically. Further, the angles $\delta$ and/or $\tau$ can be unequal to 90°.

Another possible method of setting the resonance is comprised therein of designationally setting the effective refractive index $n_{eff}$ of the individual resonators. This can ensue by means of a suitable selection of the refractive index of the respective waveguide or by means of a suitable selection of the dimensions of the respective waveguide cross section, whereby the selection of the refractive index of the environment of the resonator must also be taken into consideration.

Figure 4:
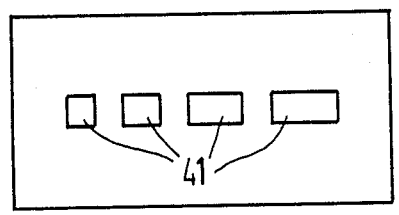
FIGS. 4, 5 and 6 are end views illustrating that the width of the resonators can be varied, as well as the height of the resonators and/or the width of the resonators.
Figure 5:
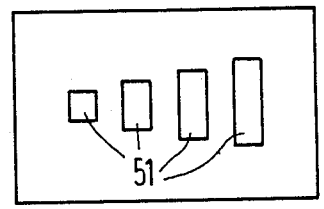
Figure 6:
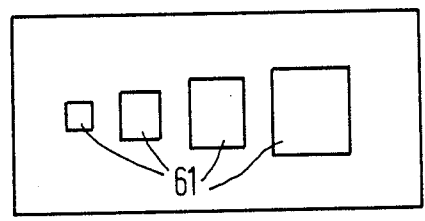
Figure 7:
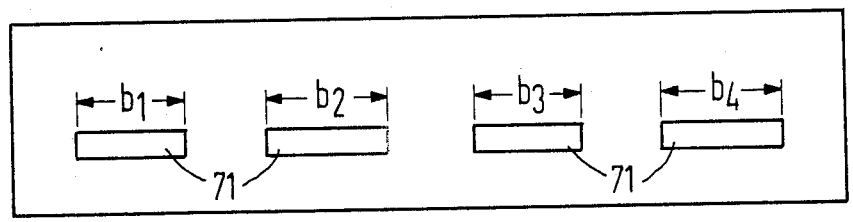
FIG. 7 is an end view illsutrating that the effective refractive index and the resonant wavelength can be accurately defined by setting the various widths of the individual waveguides.

In the latter, the known effect is exploited that, given identical wavelengths and identical profile of the refractive index discontinuities between core and jacket of two waveguides, the effective refractive index of a waveguide having a larger cross section is higher than that of a waveguide having a smaller cross section. A systematic variation of the wavelength cross sections and/or of the profiles would therefore likewise result in a corresponding variation of the resonant wavelengths of the resonators. Thus, the width of the resonators 41 can be varied as in FIG. 4, the height of the resonators 51 as in FIG. 5 or the width and height as well of the waveguides 61 as in FIG. 6. In these examples, the shape variations of respectively four waveguides are drawn exaggerated. In order to have to raise the optimally lowest demands of the manufacturing tolerances of these systematic cross-sectional changes, the fact can be exploited that, given waveguides having an elongated, rectangular cross section, a variation of the expanse of the broad side results in only a slight variation of the effective refractive index of the waveguide. With an arrangement of waveguides 71 in accord with the example of FIG. 7, therefore, the effective refractive index and, thus, the resonant wavelength can be very precisely defined by setting the width $b_1 < b_2 < b_3 < b_4$. Of course, a combination of all these setting possibilities is also conceivable.

What is referred to as the profile of the refractive index curve in the resonator perpendicular to the longitudinal axis can also be employed for setting the resonance. Accordingly, the effect of "smearing" to profile by "outdiffusion" of an initially discontinuous change of the refractive indices at higher temperatures can be exploited. The aforementioned, higher temperatures for smearing the profile can also be designationally concentrated onto a specific resonator to be tuned in that, for example, local heating is carried out with laser irradiation and finenesses of $l_{opt}$ of the individual resonators are thus influenced.

What is demanded for this setting of the resonant wavelengths of the resonator matrix is that the resonant wavelengths be correctly set relative to one another, specifically that the relative spacing of the resonant wavelengths corresponds to the desired relative channel spacing. A setting of the overall arrangement to the given carrier wavelength grid will ensue by means of a suitable, electronically controlled tuning mechanism, for example given assistance of pilot frequencies as well. Co-transmitted, unmodulated carriers can also be employed for the pilot frequencies. This tuning mechanism can, for example, be based on the controlled thermal expansion of the resonator matrix due, for example, to Peltier elements or can be based on the mechanical length adjustment by means of piezo crystals.

A few more executions of the resonator matrix of the invention shall be set forth below.

1. The resonator matrix as brancher of the invention

Figure 9:
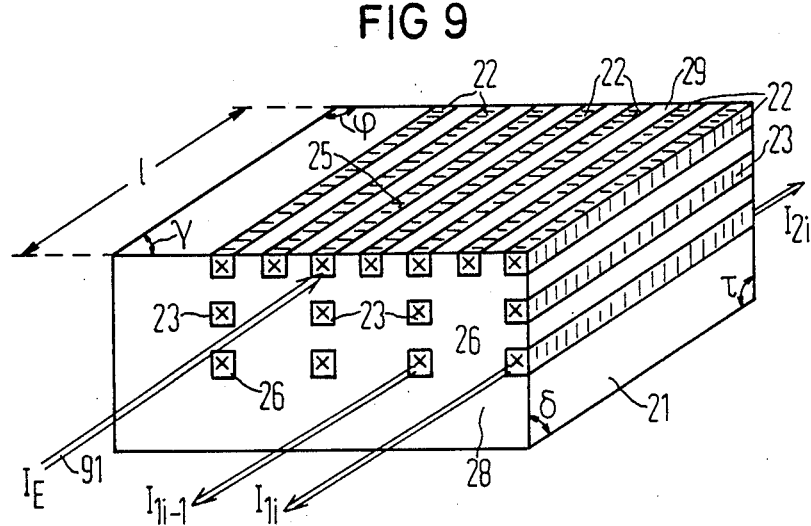
FIG. 9 illustrates the basis structuree of a passive brancher of the invention.

The fundamental structure of a passive brancher of the invention is shown in FIG. 9. The resonator matrix is composed of three levels: One level is composed of coupled resonators 22 having an in-coupling waveguide 25, one level is composed of useful resonators 23 whose resonant wavelengths define what wavelength is coupled over into a defined out-coupling waveguide 26 of the third level. The ratio of the intensities $I_{1i}$ to $I_{2i}$ in FIG. 9 can be set by the reflection factors of the mirrors.

2. The resonator matrix as collector of the invention

When the out-coupling waveguide of FIG. 9 is employed as in-coupling waveguide and the in-coupling waveguide is employed as out-coupling waveguide, then the job of combining channels is met, since the arrangement is optically reciprocal. As given the employment of the resonator matrix as brancher of the invention, all parts of the arrangement herein should also exhibit the lowest possible attenuation.

The following comment also applies to the embodiments 1 and 2 just set forth: For out-coupling in accord with embodiment 1 or for in-coupling in accord with embodiment 2, the useful resonators 23 can also be directly employed when the high reflection factors of these useful resonators are slightly lowered so that, for example, a coupled waveguide can take the intensities $I_{1i}$ and $I_{2i}$ directly at the resonators 23. The level of the special waveguide 26 is then eliminated; intermediate stages of these two types of out-coupling are also conceivable. A 1 ∶ N coupler, for example a passive brancher, can also be employed in duplex mode. I.e., that the channels 91 in-coming to the waveguide 25 in FIG. 9 are separated in wavelength-selective fashion and wavelengths which are beamed in in the waveguide 26 at $I_{1i}$ or $I_{2i}$ in the opposite direction are combined on the waveguide 25 and run in the reverse direction to 91. This is also valid by analogy to other matrix arrangements.

3. The resonator matrix as receiver/demodulator of the invention

The effect of boosting the absorption in a resonator with high quality and low absorption coefficient is known from German patent application No. P 32 05 461.0-33. A resonator also absorbs a significant light intensity in the environment of its resonant wavelength when it contains material having a very low absorption coefficient which would absorb extremely little light at the same wavelength without resonator. In the case of the receiver, the resonator is situated in the region of a pn-junction of a photodiode. The cause of the relationship between resonance and absorption, the absorption or, respectively, light detection in such a photodiode with resonator having a low absorption coefficient ensues extremely narrow-banded and in wavelength-selective fashion.

An arrangement of integrated, parallel, coupled, absorbing resonators is likewise known in accord with German patent application No. P 33 29 719.3. However, the decisive significance of the coupled resonators arranged in parallel in one level and highly coupled to one another is not yet recognized therein.

Figure 8A:
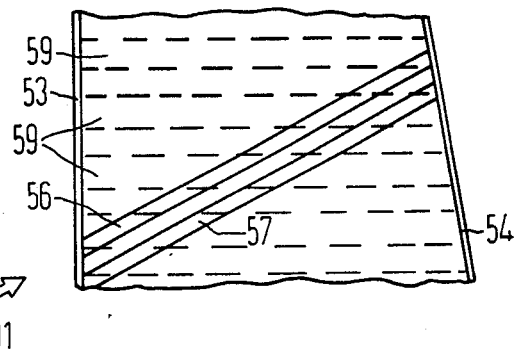
FIGS. 8a and 8b illustrate the arrangement of the German application P 33 29 719.3 which comprises a plurality of adjacent resonators in only a single level.
Figure 8B:
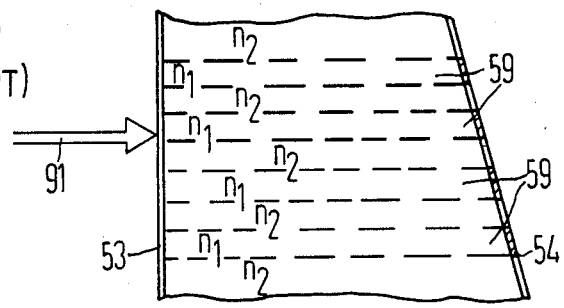

In accord with FIGS. 8a and 8b, the arrangement of German application No. P 33 29 719.3 is composed of coupled resonators 59 lying next to one another which lie in only a single level and which are mirrored with the mirrors 53 and 54. It is at most the incoupling waveguides 56, 57 for the incident radiation 91 having the intensity $I_e$ which can be allowed to proceed outside of the level of the coupled resonators 59 in this arrangement, these incoupling waveguides, however, then having to proceed obliquely relative to the parallel resonators and crossing them. This "old" arrangement therefore has the following weaknesses which complicate a technical application: Due to the mode conversions occurring there or, respectively, due to the excitation of radiation modes at the intersections, the crossings of resonators and in-coupling waveguides result in high losses. Moreover, the arrangement of FIG. 8 requires a relatively great coupling of all resonators which are intended to absorb light narrow-banded, namely a high degree of coupling to one another for an adequate energy transport between all resonators. This effects, first, relatively broad absorption resonances, second irregular shifts of those resonances as well which would be valid for the uncoupled resonators; i.e., there is no linear relationship between useful resonances and geometry, a fact which leads to tuning difficulties. Overall, this arrangement is thus suitable only for applications having few resonators.

Figure 10:
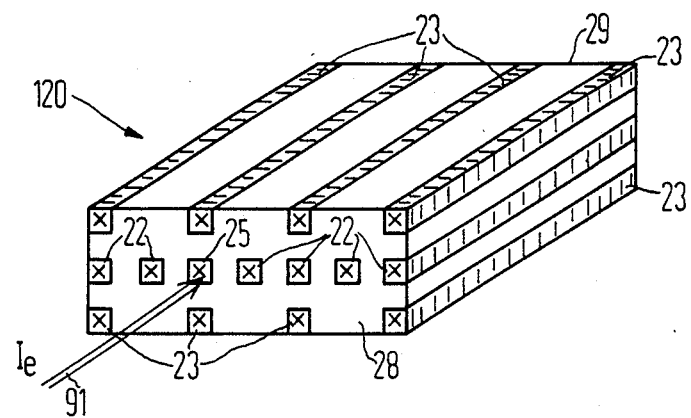
FIG. 10 illustrates another embodiment of the invention in which the resonators are arranged in two levels.

The resonator matrix of the present invention in accord with FIG. 10 in the embodiment 120, by contrast, produces the following significant improvements for the receiver/demodulator. Since the resonators 22 and 23 not only lie next to one another but are arranged in at least two levels, one level, namely the level of the highly coupled coupled resonators 22, is available for energy distribution, so that the resonances of the weakly coupled useful resonators 23 used for light detection in the pn-junction of a photodiode are now not significantly broadened. In contrast to the prior art and to the teaching to technical action set forth in German patent application No. P 33 29 719.3 - whose first patent claim expressly requires a waveguide coupling between the absorption resonators 59 of FIG. 8—and to the teachings to be drawn from the aforementioned application by a person skilled in the art, the useful resonators 23 in the resonator matrix of the invention, these useful resonators 23 being intended to absorb the light in wavelength-selective fashion and tuned to the individual carriers as a result of the resonator effect, are arranged such with full intent and corresponding advantage in at least one additional level that they are at a great distance from neighboring resonators of the same type 23 and such that these are not in communication or communicate as little as possible with these due to waveguide coupling. This takes care of, first of all, the narrow-bandedness of the absorption and, second, for the fact that the resonances of the useful resonators 23 are preserved as though they were not coupled.

The in-coming light is coupled in into a single incoupling waveguide 25.

In the detection of light by means of resonators, it is only the employment of a plurality of levels which makes the construction of a "multicircuit" receiver system possible, as shall be shown later.

Figure 11:
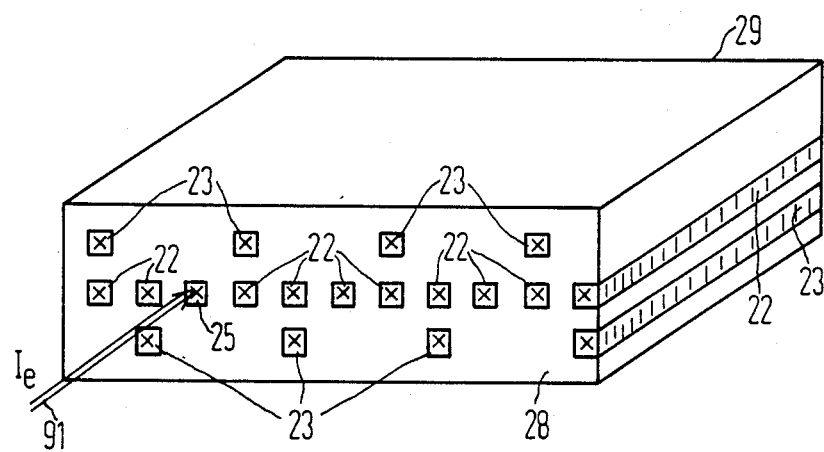
FIG. 11 illustrates a resonator matrix which contains a second level of useful resonators in which two useful resonators can be coupled to a resonator as in FIG. 10, but in which the useful resonators of various levels are arranged offset.

When a resonator matrix contains a second level of useful resonators, then two useful resonators 23 can be coupled to a coupled resonator 22, as in FIG. 10. However, a resonator matrix wherein the useful resonators of various levels are arranged offset as in FIG. 11 is also possible.

Since, due to the high mutual couplings, the absorption-boosting effect of high-quality resonators does not occur or occurs to only a slight degree in the coupled resonators, the space charge zone of the photodiodes polarized in reverse direction can also encompass the level of the coupled resonators. With respect to the useful resonators, in any case, however, the pace charge zone of a photodiode need only include the useful resonator/resonators belonging to it in terms of wavelength, since the wavelength-selective absorption of the light ensues there.

When the demodulation in the receiver is to be carried out by means of a known heterodyne or homodyne method, the appertaining carrier must be supplied to every receiver channel. For example, this can ensue in that the unmodulated carriers are supplied to the in-coupling waveguide 25 of FIG. 12, from the other side in comparison to the modulated channels, or, in accord with FIG. 13, can be supplied by means of a preceding coupler 33, preferably a 3 dB coupler. The wavelength-selective separation of the unmodulated carriers again ensues in the useful resonators.

The further processing of the electrical signals in the prior art ensues dependent on the type of modulation employed, i.e., for example, amplitude modulation, frequency modulation, phase modulation, etc. The electronics required for this purpose can be integrated on the same semiconductor material as the receiver/demodulator resonator matrix.

4. The resonator matrix as modulator of the invention

Figure 14:
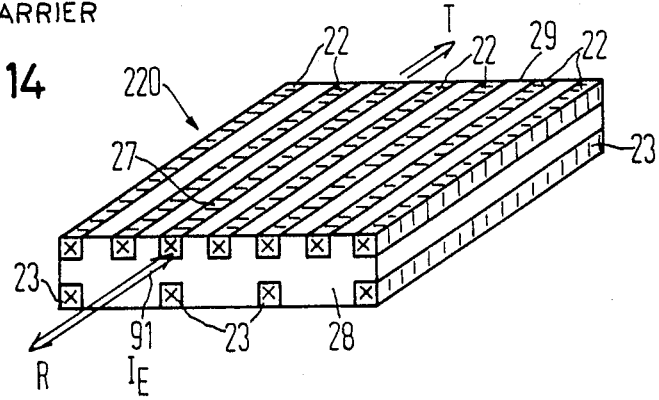
FIG. 14 illustrates another resonator matrix which can be utilized for modulation of a plurality of channels.

A further resonator matrix 220 of FIG. 14 can also be utilized for modulation of a plurality of channels, all channels as well of the input signal $I_e$. As already mentioned, due to its principle, the modulator composed of a resonator matrix fulfills the following jobs in one geometrical arrangement:
Separating many carriers
Modulating the individual carriers independently of one another
Combining the modulated carriers FIG. 14 contains only two levels; however, three levels are conceivable in this arrangement as in FIGS. 10 or 11.

The manner of functioning of a modulator resonator matrix shall be set forth below: The properties of the overall arrangement can be described by the curves of the reflection and transmission dependent on the wavelength. T denotes transmitted energy, R denotes reflected energy respectively referred to the incident energy. On principle, T and R are the two usable output signals of the arrangement.

The modulation is realized by a wavelength-selective influencing of the transmission curves or reflection curves which lies only in the environment of individual carriers. The parameter modification at an individual useful resonator 23 is intended to influence an individual channel.

Available as possible parameters whose variation leads to an intensity modulation and/or phase modulation of the individual carriers are:
Modification of the absorption in the useful resonator, for example by means of charge carrier injection with the assistance of a pn-junction.
Shift of resonant wavelength in the useful resonator by means of, for example, electro-optical effect, charge carrier injection.
Modification of the coupling of the useful resonator to the coupled resonators effected, for example, by the electro-optical effect.

FIGS. 15, 16, 17, 18 show the fundamental effects of an absorption boost in the useful resonators on the transmission curves and reflection curves T and R with reference to an example of three useful resonators. $\alpha$ thereby respectively denotes the absorption coefficient.

Figure 15:
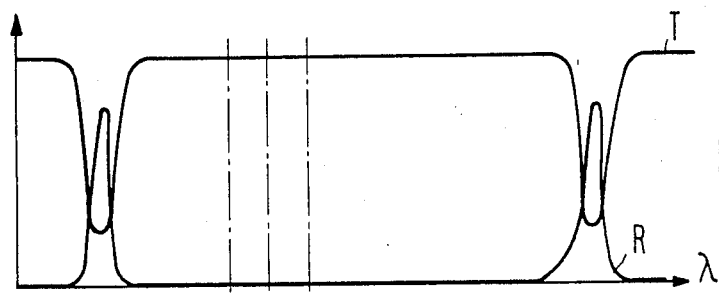
FIGS. 15–18 illustrate the basic effects of an absorption increase in the useful resonators on the transmission curves and reflection curves T and R with respect to an example of three useful resonators.

FIG. 15: Transmission and reflection of the coupled resonators, coupling of the useful resonators negligible.

Figure 16:
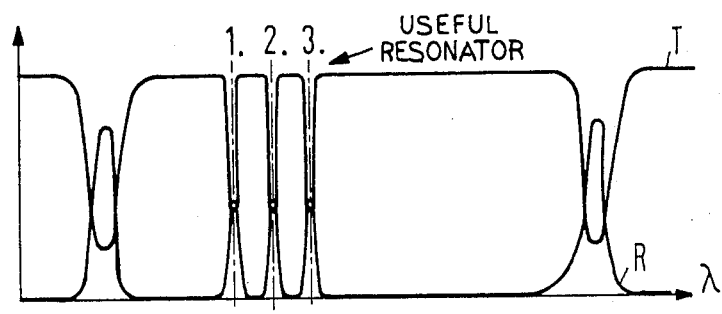

FIG. 16: Transmission and reflection, three coupled useful resonators, $\alpha = 100$ 1/m in the three useful resonators.

Figure 17:
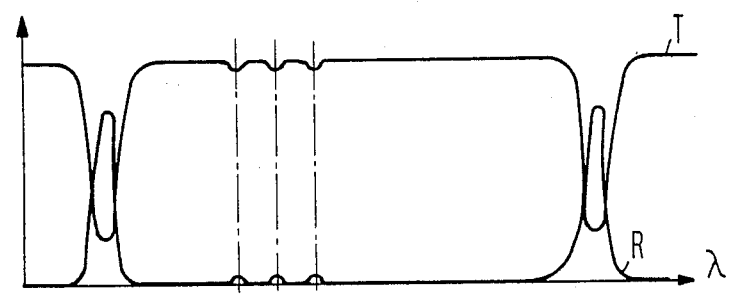

FIG. 17: Transmission and reflection, three coupled useful resonators, $\alpha = 1000$ 1/m in the three useful resonators.

Figure 18:
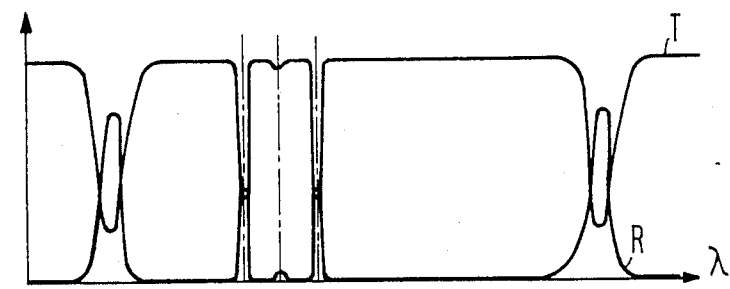

FIG. 18: Transmission and reflection, three coupled useful resonators $\alpha = 100$ 1/m in the first and third useful resonators, $\alpha = 1000$ 1/m in the second useful resonator.

The transition from FIG. 15 to FIG. 16 also shows the influence of modified coupling of three useful resonators on the overall transmission or, respectively, reflection.

The third form of the modulation, the modification of the resonant frequencies of the useful resonators shifts the useful resonances relative to the carriers, for example, in FIG. 16.

The said modification of the absorption in a useful resonator is particularly easy to realize. When each of the useful resonators is fashioned as a diode comprising a pn-junction, then, by setting the diode forward current or, respectively, the inverse voltage, the number of free charge carriers in the useful resonator can be controlled and, thus, the height of the absorption can be defined. The injection or extraction of free charge carriers also effects a change of the refractive index and, thus, a change of the optical path length. Which of the two effects dominates depends on the material employed. The operating point can be set by means of a DC voltage component of the applied diode voltage and, thus, a tuning to the desired resonant wavelength can be simultaneously undertaken, whereas the modulation ensues by means of the superimposed alternating component of the electrical modulation signal.

Moreover, a modulation is also achieved when the corresponding parameters of the useful resonators 23 of the 1−N coupler of the invention of FIG. 9 set forth above is varied, since the coupling-over into the outcoupling waveguide 26 also depends on these parameters. In this example, however, the light is only separated or only combined and modulated.

When two useful resonators are tuned to the same channel, i.e. to the same wavelength, and when the two operating statuses are compared (a)
first useful resonator, high absorption
second useful resonator, low absorption
and, in contrast thereto,
(b)
first useful resonator, low absorption
second useful resonator, high absorption,
then one can see that the appertaining channel exhibits the same amplitude in the output signal in both operating statuses. Since the optical light path is different in both cases, however, the phase of the output signal has changed. What can thus be achieved here is that only the phase is modulated and, accordingly, one can speak of a push-pull phase modulator.

A further possibility of achieving a similar effect is as follows: A 1—N coupler having, for example, variable absorption is employed in order to optionally switch one channel onto two different output waveguides which conduct the signals into a second 1—N coupler via different optical paths, this second 1—N coupler again combining the signals onto a line. The output signal again has the same amplitude but has a different phase dependent on which waveguide it traversed the path between the two 1—N couplers or, respectively, dependent on the ratio with which the light energy is distributed onto the two waveguides.

5. The resonator matrix as repeater of the invention

Figure 12:
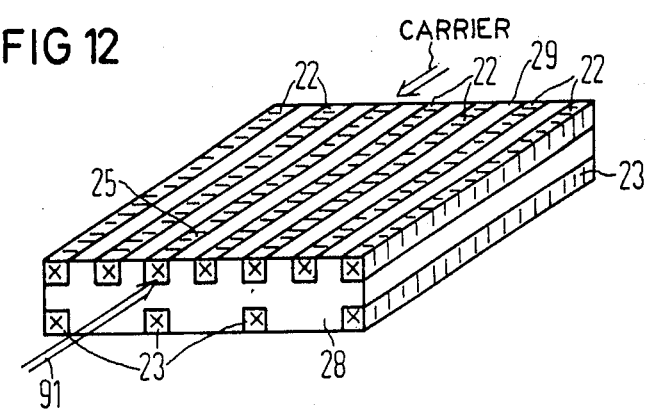
FIG. 12 illustrates an arrangement for supplying a plurality of receiver channels in which modulated carriers are supplied to the in-coupling waveguide.
Figure 13:
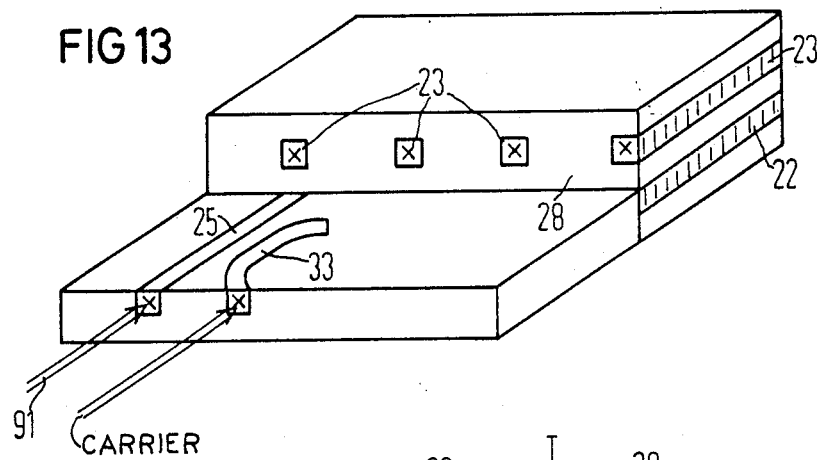
FIG. 13 illustrates an arrangement in which modulated channels can be supplied by way of a preceding coupler, such as a 3 dB coupler.

A resonator matrix which is employed as repeater has, for example, the shape of FIGS. 10, 11 or 12. In this application, however, the useful resonators 23 are fashioned as lasers which do not meet the laser condition of lasers, i.e. which in fact contain inverted semiconductor material during operation but which do not emit any laser light without additional influencing from the outside. Only when light is beamed in from the outside the wave beamed in is intensified by induced emission.

A direct semiconductor is needed for the useful resonators 23 of a resonator matrix in this application. At this point, we would like to point out that indirect semiconductors can become direct semiconductors when what are referred to as "super lattices" are produced, when, thus, for example, layers of germanium and silicon whose thickness lies in the atomic range periodically follow one another in a single crystal, (reference 3).

In comparison to a linear amplifier shared by all channels which, of course, would be constructed far simpler, this arrangement would have the advantage that different wavelengths are locally amplified in different regions of the arrangement, i.e. a mutual influencing of the amplification of different wavelengths is far less possible. This resonator matrix can also be employed for the modulation of optical channels in that the injection currents into the various useful resonators and, thus, the gain of the individual useful resonators is controlled dependent on electrical modulation signals.

This arrangement also enables the amplification of frequency bands modulated in parts whose totality is broader than the amplification bandwidth of a laser amplifier, since the individual frequency bands are amplified locally separated in different parts of the matrix arrangement which can contain different laser material having different amplification bands. This different material can be realized, for example, by means of a $Si_xGe_{1-x}$ super lattice having different super lattice structure.

The functioning of the examples of resonator matrices set forth up to now is based thereon that the individual useful resonator is coupled only to the coupled resonators but is coupled as little as possible or not at all to the other coupled resonators. The third level in the 1—N coupler of FIG. 9 is not composed of narrow-band useful resonators 23, rather the waveguides of this level serve as out-coupling waveguide 26. The above examples can therefore be referred to as single-circuit filters.

The filter effect, let this be expressly emphasized here, in a resonator matrix is fundamentally based on the structure of the resonator arrangement, i.e. on the described type and nature of the optical coupling of the individual resonators. The filter effect is thus not based on the functioning of electrical or electronic filter circuits. Filters and filter transfer functions, of course, can be realized in many different ways, for example, by means of the afore-mentioned electrical/electronic filters. The subject matter of the invention, however, is an arrangement of optical resonators for the realization of optical filters. The electrical signals which are acquired from the resonators matrices can be potentially further-processed with the additional assistance of electrical/electronic filter circuits; this is carried out, however, in accord with the prior art and is only a subject matter of the patent application insofar as the electrical/electronic filter circuits can be integrated on a semiconductor substrate together with the resonator matrix.

Figure 19:
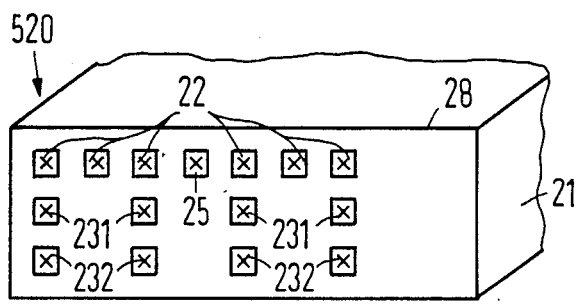
FIG. 19 illustrates an embodiment for a multi-circuit repeater.

The cross talk attenuation between two channels can be considerably improved by means of a resonator matrix 520 in FIG. 19 in that the respective useful resonator 231 has a second useful resonator 232 of the same resonant wavelength coupled to it and the signal of this second useful resonator 232 is used for influencing the light, i.e., for example, the absorption. One can then speak of two-circuit filters or given an analogously expanded arrangement, of multi-circuit filters.

A receiver/demodulator would then have the form of FIG. 19. The photodiodes may only detect the light in the second level of the useful resonators 232.

A multi-circuit repeater, for example, would likewise have the form of FIG. 19; the absorption photodiodes, however, are then to be replaced by optically active materials.

Figure 20:
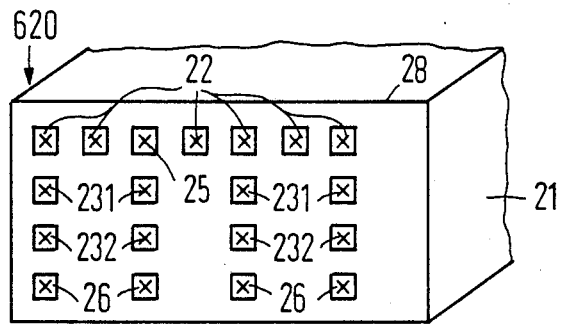
FIG. 20 illustrates a two-circuit construction of a 1—n coupler.

In, for example, a two-circuit execution, a 1—N coupler would have the form 620 of FIG. 20. As given the resonator matrix as brancher of the invention or as collector of the invention, coupling for out-coupling herein can also be correspondingly directly carried out at the useful resonators 232, given slight reduction of the reflectivity of the mirrors of these useful resonators.

Figure 21:
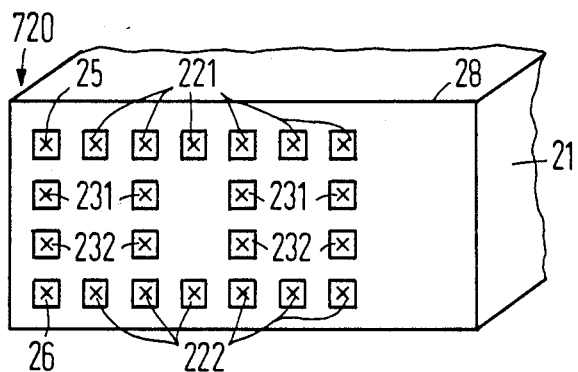
FIG. 21 illustrates a multi-circuit modulator requiring a further level of coupled resonators.

In addition to the first level of coupled resonators 221, a multi-circuit modulator 720 would require a further level of coupled resonators 222 as collecting level for the light, in accord with FIG. 21. A further possible structure for a two-circuit modulator first contains a two-circuit 1—N coupler, for example the arrangement 620 of FIG. 20. The first resonator matrix acts as brancher, the second resonator matrix acts as collector, whereby the two are connected by the waveguides 26. The control of the parameters of a useful resonator level of the brancher in this combined arrangement can be used in the modulation of the individual channels.

The useful resonators 231, 232 lying above or below one another in, for example, FIG. 20 form useful resonator groups which are not coupled to one another or are coupled to one another at least as little as possible and which contain two useful resonators in this example The concept of the useful resonator group can also be generalized and the individual useful resonator 23 in, for example, FIG. 2 which is not coupled to the other useful resonators or is coupled thereto as little as possible can be referred to as a useful resonator group which contains only one element.

Available as basic material for the resonator matrix are semiconductor materials which allow the pn-junctions required in the various applications to be realized in the resonator matrix and which allow the supplementary electronics to be integrated on the same semiconductor chip, for example, an electronic regenerator circuit for the received signals It can be meaningful to integrate a second resonator matrix on the same semiconductor substrate, this operating optically independently of the first resonator matrix. For example, given a regenerator, the receiver/demodulator of the invention can be integrated first on a substrate, the electronic regenerator circuit including clock recovery can be integrated thereon second and the modulator for the amplified but not yet unmodulated carriers can be integrated thereon third. Of course, a plurality of resonator matrices can be integrated on a substrate, these either being optically independent, for example for a plurality of independent carrier systems, or being arranged optically following one another, for example, a multi-circuit 1−N coupler of the invention for simultaneous separation and modulating of the channels and a following 1−N coupler of the invention for combining the channels.

Figure 22:
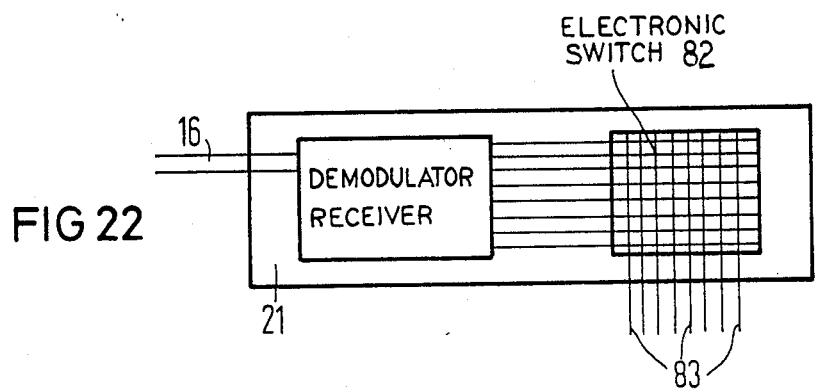
FIG. 22 illustrates the expansion of an electronic exchange circuit which can be integrated on the same receiver/demodulator resonator matrix.
Figure 23:
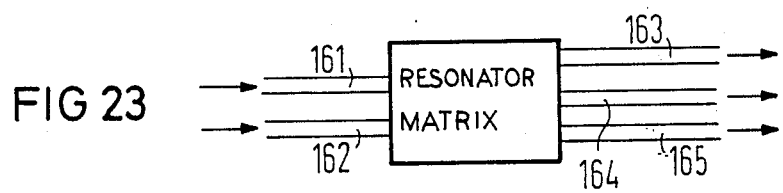
FIG. 23 illustrates the provision of incoming and outgoing fibers and a switch for transferring signals.

A further, very important example of expanding electronics is an electronic exchange circuit which can be integrated on the same semiconductor substrate as the receiver/demodulator resonator matrix. FIG. 22 shows the principle of such an arrangement. The modulated carriers and, dependent on the demodulation method, the amplified, unmodulated carriers as well are supplied to the electro-optical semiconductor circuit via a glass fiber 16. In the receiver/demodulator resonator matrix, for example a matrix 120, the optical signals are separated in wavelength-selective fashion and are converted into electrical signals. With the assistance of the co-integrated electronic exchange circuit 82, these signals can now be optionally applied to various electrical output lines 83. These output lines can then be grouped or be individually supplied to different final receivers or to further circuits or, respectively, resonator matrices which reconvert the electrical signals into optical signals and which can be integrated on the same substrate. On the basis of the latter possibility, it is possible to arbitrarily distribute the information of the channels of a carrier system onto other channels of further carrier systems. When the in-coming glass fiber lines 161 and 162 in FIG. 23 each comprise, for example, ten channels, the information of each individual channel can optionally be switched onto the glass fiber lines 163, 164 or 165 also comprising, for example, ten channels each.

Figure 24:
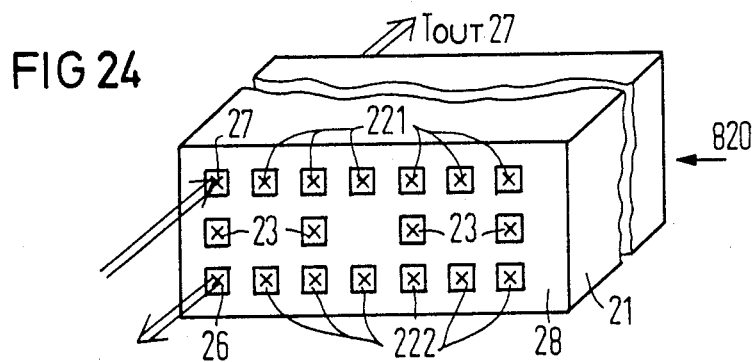
FIG. 24 illustrates a resonator structure for optical switching of channels.
Figure 25:
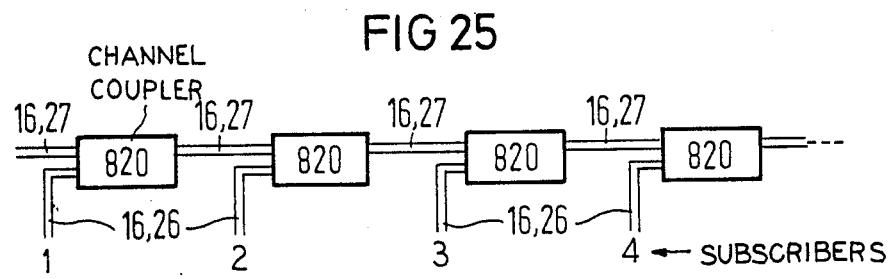
FIG. 25 illustrates an exchange circuit comprising a plurality of elements for energy distribution.
Figure 26:
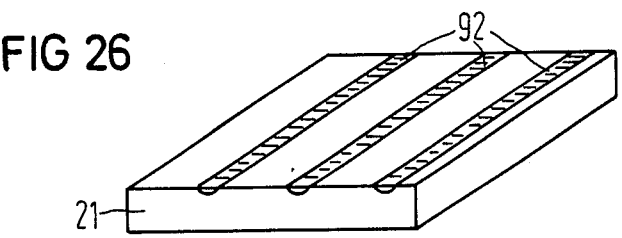
FIG. 26 is a schematic representation of a matrix for producing a lower contact of the diodes by p doping of the substrate.

Moreover, an optical switching of the channels is also possible. For example, a resonator structure 820 of FIG. 24 can be employed In addition to a first level comprising coupled resonators 221, this contains a second level comprising coupled resonators 222. The first coupled resonators 221 again have the job of distributing the energy; the second coupled resonators 222 herein have the job of collecting the energy and carrying it off via the out-coupling waveguide 26. By means of the same parameter modification as set forth in the modulation, the useful resonators 23 have the job of optionally coupling channels from the first coupled resonators 221 over to the second coupled resonators 222 in wavelength-selective fashion. A possible exchange circuit comprising these elements 820 is shown in FIG. 25.

The following values, for example, can be assumed as a typical example of the geometrical sizes of a resonator matrix: Quadratic or nearly quadratic waveguides having the side length of about 1 $\mu$m given a refractive index discontinuity of n=0.24 are selected for the resonators. Without mirror layers, the typical length of the resonators lies between 50 and 150 $\mu$m. The spacings from one coupled resonator 22 to a neighboring coupled resonator 22 and from one coupled resonator 22 to a first useful resonator 231 and from a first useful resonator 231 to a second useful resonator 232, for example see FIG. 19, are selected such in this example that the respective couplings behave, for example, like 1:0.033:0.003. Since, given an increasing distance of resonator from resonator, the couplings, however, exponentially decrease, the spacings in this example behave like 1:5.3:8.3. All Figures in this specification which show structural examples of resonator matrices are not drawn true to scale. In particular, similar to the above example, the spacings of the resonators are not sketched in accord with their ratio and electrical leads and required pn-junctions are likewise not shown in most examples A few examples shall be cited in this regard in the following sections, these being analogously transferable to all resonator structures which require pn-junctions for their function.

The Figures with structural examples of resonator matrices show the structure by way of example. Even where it is not expressly mentioned, an expansion to three or more levels can analogously ensue, just like the number of resonators lying next to one another can be modified, being particularly increased. The position of the in-coupling waveguide and/or out-coupling waveguide in a coupled resonatorlevel is likewise only by way of example. The function of a resonator matrix is also preserved when "top" and "bottom" are interchanged in the examples and/or when the overall arrangement is turned by an angle of, for example, 90°.

The resonator matrices which do not require pn-junctions for their function, i.e., for example, the 1−N couplers of the invention, can also be realized on glass-like substrates.

As to the examples of the structure of resonator matrices, the manufacture of a resonator structure in a plurality of levels shall now be set forth with reference to the example of a demodulator and with reference to the example of the material combination silicon and germanium. This material combination would also have the advantage that one or more resonator matrices, other electro-optical devices and/or augmenting electronics can be integrated on a silicon substrate. This could occur, for example, in that the resonator matrix or matrices with the appertaining mirrors are manufactured as the last step of an integrated circuit in that suitably doped Si and $Si_xGe_{1-x}$ layers are applied with "cold" epitaxy, i.e., for example, with MBE at about 600° C., being applied on a circuit manufactured in a standard way, i.e., for example, with "hot" diffusion at 1,100° C.

First, however, a few material data shall be specified,
n=refractive index
Basic material Si: $n_{Si} \approx 3.6-3.4$ 1 $\mu$m$>\lambda>$2 m Ge: $n_{Ge} \approx 5-4.2$ 1 $\mu$m$>\lambda>$2 m
Waveguide: $Si_xGe_{1-x}$: $n_{Ge} \leq n_x \leq n_{Si}$ Mirror layers: SiO$_2$:n≈1.6−1.4

A mixture Si$_x$Ge$_{1-x}$ 0≦x≦1 has the property that the band space and the refractive index of the mixture assume values between the corresponding values of the pure materials Si and Ge. The refractive index of the mixture is greater than given pure Si and the curve of the absorption coefficient dependent on the wavelength in the region of the band edge is shifted toward greater wavelengths, whereby the fundamental curve remains preserved over the wavelength, i.e. a parallel shift of the absorption curve toward greater wavelengths occurs, see references 4, 5, 6 and 7.

For example, in the environment of λ=1.3 μm, the mixture Si$_{0.7}$Ge$_{0.3}$ has the same absorption properties as pure Si in the environment of λ=1.1 μm and the refractive index at λ=1.3 μm is increased by Δn≈0.24 in comparison to pure Si.

The selection of the mixing ratio x thus allows the absorption to be set dependent on the wavelength. Dependent on the Ge part, a more or less well-guiding waveguide arises at the same time.

The manufacture of the Si$_x$Ge$_{1-x}$ mixture as a single crystal ensues, for example, by means of molecular beam epitaxy=MBE, (reference 8).

The manufacture of the resonator structure then ensues, for example, in the following steps 1 through 8 whose result is a resonator matrix 920 "placed" on a substrate 21, as sketched, for example, in FIG. 34. As in all structural examples of resonator matrices, only a small portion of the substrate 21 is shown in FIGS. 26 through 31 relating to the manufacturing steps 1 through 8. Before beginning manufacture of the resonator matrix 920, the substrate, as shown in FIG. 34, can already contain 1 or more regions 105 with integrated electronics and/or optical elements such as, for example, an in-coupling waveguide 25 placed outside of a resonator level and a coupler 33 for the addition of unmodulated carriers given heterodyne or homodyne demodulation. The in-coupling or out-coupling of light in the wavelength of optical communications technology into or out of the optical or electro-optical component 1020 of the integrated optics ensues in the prior art with, for example, prism couplers or, for example, with guide grooves 109 for glass fibers which abut against integrated waveguides, for example, 25. One or more additional resonator matrices can be integrated on the same component 1.020 in parallel work steps.

1. Produce "lower" contact 92 of the diodes, for example by p-doping of the substrate 21, as in FIG. 26.

2. Apply a plurality of μm-thick layers 95 of intrinsic Si by means of MBE, as in FIG. 27.

3. Etching of "shafts" 96, FIG. 28, by means of Si privileged etching (references 9 and 10), whereby, for potential adjustment of the desired resonant wavelengths of the resonators formed at a later point in time in these shafts, the shafts can be provided in different widths Given selection of the "correct" crystal levels as etching levels, Si privileged etching guarantees extremely smooth etched faces which later form the lateral limitation of waveguides 196. Scatter losses in waveguides are thereby reduced to a minimum.

4. Alternately filling the "shafts" 96 by means of MBE in accord with FIG. 29 with pure Si 98 and Si$_x$Ge$_{1-x}$ 99 for waveguides 97, whereby, for potentially setting the desired resonant wavelengths in the resonators, the height of the waveguides 97 formed by Si$_x$Ge$_{1-x}$ 99 is selected differing in size. The geometrical spacings of the waveguide layers must thereby be dimensioned such that the required high, weak and optimally low couplings arise.

5. In accord with FIG. 30, apply cover layer 101 of pure Si and upper contacts 93, n-conductive in this example.

6. In accord with FIG. 31, cutting to correct lengths and desired widths, for example, by anisotropic or mechanical working, whereby the angles γ or φ or δ or τ can potentially not be 90°, in order to effect a setting of the resonators to the desired resonant wavelength spacings by means of the slant of the reflector faces thereby created.

7. Apply mirror layers to end faces 102 and 103, for example, SiO$_2$ and Si in alternation. These two materials exhibit a great refractive index discontinuity. All other materials known from optical applications, however, are also possible. Advantageous in accord with the manufacture is that the mirroring of one side can form the mirroring of all resonators of this side. Only individual waveguides should be excluded from the mirroring because of the in-coupling and/or out-coupling of light A further possibility of mirror manufacture is also comprised in first realizing mirror layers as "shafts" by privileged etching=anisotropic etching, these shafts being filled with a suitable material, for example, SiO$_2$, in further work steps. Instead of reflectors applied in common to the end faces, built-in grating reflectors known from optical communications technology or grating-like structures can be employed as well in the individual waveguides which form the resonators. What is understood by these latter grating-like structures are intermediate forms between dielectric mirrors and grating reflectors.

8. In case the resonator matrix to be manufactured contains in-coupling or out-coupling waveguides which lie outside of the substrate level which, for example, contains the waveguide 25, parts of the substrate 110 can be re-raised, for example, by means of MBE, after the mirror manufacture for the useful and coupled resonators, as in FIG. 35, in order to accept these in-coupling and/or out-coupling waveguides.

Steps 1 through 8 enumerate only the fundamental manufacturing steps. The practical execution requires technological intermediate steps such as the application of photographic layers, etch stop layers, etc.

Conceivable modifications of the manufacture or of the structure are:

Thin films or even tongue-shaped structures can be manufactured in Si, (see reference 11). This would make step 2 in the above step sequence superfluous, since the lower contacts 92 can be applied on the underside of a foil or tongue. Subsequently, however, a foil would have to be mechanically stabilized.

Figure 31:
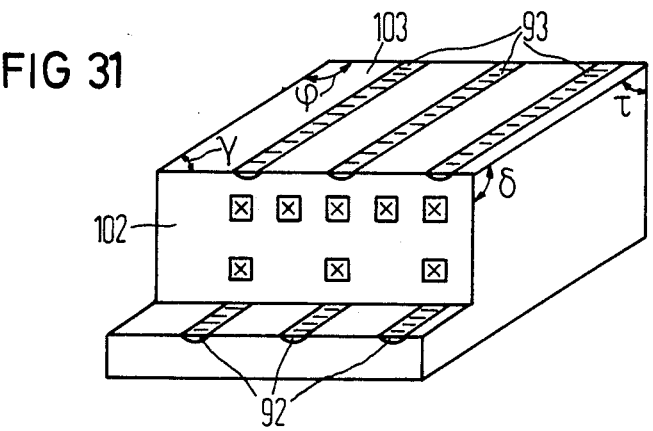
FIG. 31 illustrates the cutting of the device to prescribed lengths and widths by anisotropic or mechanical means.

In the structure of FIG. 31, the lower contacts 92 or the upper contacts 93 could be fashioned planarly and not conductor-shaped.

Two or more different conductor-shaped contacts 92 can be electrically connected. This is also true of the contacts 93.

Figure 32:
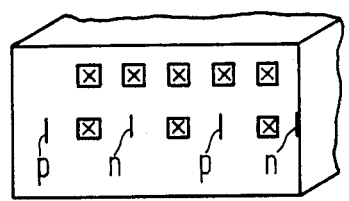
FIG. 32 illustrates that contacts or pn layers can be applied between the useful resonators in the grooves.

The contacts or, respectively, the pn-layers 92 and 93, as in FIG. 32, can likewise be applied between the useful resonators in the shafts. Steps 1 and 2 and part of step 5 could thereby be foregone.

The contacts can be fashioned U-shaped as in FIG. 33.

The electrical "connection" of contacts 93 formed planarly to the level which contains the lower contacts 92 and potentially integrated electronics 105 can, as shown in FIG. 34, for example, ensue by filling up an etched "shaft" with n-conductive material.

The growth of material and the etching and filling of the shafts of work steps 2, 3 and 4 can be undertaken in a plurality of successive steps level-by-level. The etching and filling of excessively deep shafts is thereby avoided.

Alternatively to manufacturing step 2, not only intrinsic Si but a plurality of successive layers Si, $Si_xGe_{1-x}$ can be grown on the substrate, as in FIG. 36. Subsequently, shafts can again be etched in this structure, as in FIG. 37. Subsequently, these shafts are filled with material having a suitable refractive index which now forms the regions between the core regions of the waveguides and which need not necessarily be mono-crystalline. This growth of material and etching and filling of the shafts can also ensue a plurality of steps Each of these steps then covers only one level or only a few levels of the resonator matrix to be manufactured.

The "block" of the resonator matrix 920 in FIG. 34 need not be etched free at all sides. Fundamentally, only the end faces 102 and 103 must be exposed for a mirroring.

Figure 27:
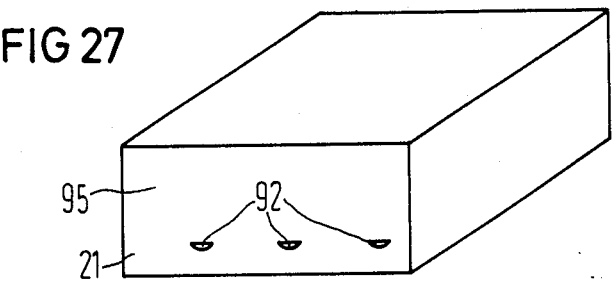
FIG. 27 illustrates a similar structure in which the application of a plurality of micromillimeter thick layers of intrinsic silicon.

"Holes" 131, as in FIG. 38, can be etched into a substrate wafer 21 which contains either only pure Si having the cross section of FIG. 27 or a layer structure having the cross section of FIG. 36, these "holes" comprising two faces 128 and 129 lying opposite one another which form two planar surfaces residing nearly parallel to one another or at a defined angle relative to one another. These surfaces form the front and back 102 and 103 of a later resonator matrix and are mirrored by applying reflector layers. When the etched "holes" 131 are large enough, even rounded corners as arise in anisotropic etching process, cf. FIG. 39, are not disturbing since only the sub-surfaces of 128 and 129 are used for the resonator matrix, these being planar or nearly planar. The first mirror layer which is applied to the surfaces 128 and 129 is preferably of a material which is not attacked by anisotropic etching. After the mirroring, shafts can be etched into the intermediate region 106 and can be filled in accord with the said manufacturing alternatives.

Outside faces 228 and 229 can be utilized for one of the mirror faces of a resonator matrix. In this way, a plurality of resonator matrices can be integrated on a substrate in the various regions 106 in a simple way, see, for example, FIG. 39.

The etching of the shafts and, analogously, the other manufacturing steps in the above examples ensued perpendicular to the various resonator levels The manufacturing steps can also ensue parallel to the resonator levels in the substrate of FIG. 40 rotated by 90°.

All other matrix structures, particularly those having a plurality of resonator levels, can be manufactured with corresponding manufacturing steps. In particular, it is to be pointed out that the plethora of known methods of semiconductor technology can, of course, be employed as desired for the manufacture of the subject matters of the invention without essential inventive activities being thereby required.

In contrast to all other illustrated examples for resonator matrices in which the resonators lie exactly above or below one another, the useful resonators 23 and 231 of FIG. 41 can also be arranged offset between coupled resonators 22 and/or two weakly coupled useful resonators 231 and 232 of two neighboring levels can be arranged offset. A coupled resonator level of FIG. 42 which is defined by the resonators 22 can contain useful resonators 23, 231, 232 at one and/or at the other end of the level.

Further optical elements such as, for example, additional waveguides or resonators which can be integrated on the same substrate as a resonator matrix but which do not influence the functioning of the resonators of the resonator matrix can be arbitrarily arranged on the substrate.

The geometrical form of the integration of the optical resonators combined into groups under the designations coupled resonators or useful resonators is not limited to the arrangement in levels. A final comment shall therefore yet be made regarding the meaning of the word level. In the preceding, this term only serves the purpose of describing a topological relationship There are no fundamental difficulties of greatly departing from the level as geometrical figure As described in the preceding, the only thing involved in terms of the function is the degree of coupling between essentially parallel and preferably laterally single-mode waveguide resonators. These couplings form the inventive relationship between the resonators which can be geometrically realized in numerous ways, technically preferably with arrangements in levels under given conditions.

References (1) M. Börner; Vorträge 6. Internationaler Kongress LASER 83, p. 425, "Optoelektronik in der Technik", W. Waidlich, Springer Verlag (2) Serge Luryi, Alexander Kastalsky, John C. Bean, New Infrared Detector on a Silicon Chip, IEEE TRANSACTIONS on ELECTRON DEVICES, ED-31, 1984, p. 1135

(3) German Patent Application: No. P 21 39 436.5-33

(4) Landolt Börnstein, II, 6, p. 375

(5) Landolt Börnstein, I, 4, p. 889

(6) Landolt Börnstein, Neue Serie, III, 17a, p. 449

Figure 28:
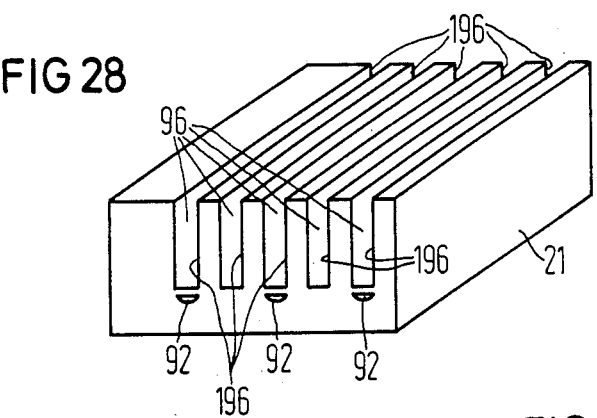
FIG. 28 illustrates the etching of grooves by silicon privileged etching of the adjustment of the desired resonant wavelengths of the resonators.

(7) Landolt Börnstein, I. 8, FIG. 28 22 12

(8) E. Kasper a. K. Wörner, Application of Si - MBE for Integrated Circuits, Proc. 2nd Int. Symp. VL$^{SI}$ Science a. Technology, Chincinatti, 1984, p. 429

(9) K. E. PETERSEN, Silicon as a Mechanical Material, Proceedings of the IEEE, Vol. 70, No. 5, 1982, p. 420

(10) N. Tsamita et altera, Fabrication of X-ray masks L using anisotropic etching of (110) Si and shadowing techniques, J. Vac. Sci, Technol. 19 (4), 1981, p. 1211

(11) BMFT - Research Report T 83-089

(12) H. Dammann, H. Schmitt, G. Schmitz, Design a. analysis of a waveguide isolator with a formbirefringent top-layer. ECOC 84, p. 42

We claim:

1. Arrangement of optical resonators which are composed of dielectric waveguides which are mirrored at their ends predominantly with reflectors having high reflection factors close to the value one and whose longitudinal extent between the reflectors is great in comparison to the transverse dimensions perpendicular thereto, characterized in that all optical resonators are integrated on a substrate to form a matrix-like arrangement, referred to as resonator matrix, being integrated such that two types of resonators can be distinguished, whereby the resonators of the first type are highly coupled to one another and act as coupled resonators (22, 221, 222), whereas the resonators of the second type act as wavelength-selective useful resonators (23, 231, 232) and, in comparison to the couplings between the resonators of the first type, are weakly coupled to one another or, respectively, to the resonators of the first type and form at least two useful resonator groups which are coupled to one another as little as possible, whereby a useful resonator group contains one or more useful resonators.

2. Resonator matrix according to claim 1, characterized in that all resonators have their longitudinal axes essentially parallel to one another.

3. Resonator matrix according to claim 1 characterized in that all optical resonators are integrated essentially parallel in at least two planes on a substrate, being integrated to form a matrix-like arrangement, whereby the resonators of at least one level are predominantly highly coupled to one another and thus act as coupled resonators (22, 221, 222), at most with the exception of a number of resonators at one and/or the other end of the coupled resonator level which can function as useful resonators (23, 231, 232), and whereby the resonators of at least one other level which is at least nearly parallel to the coupled resonator level are not coupled to one another or, respectively, are coupled to one another as little as possible and, thus, act as wavelength-selective useful resonators (23, 231, 232) which are practically independent of one another, whereas the couplings between the resonators of two different levels are predominantly weak in comparison to the coupling of the coupled resonators to one another.

4. Resonator matrix according to claim 1, characterized in that the optical signals are coupled in and coupled out via a single in-coupling and out-coupling waveguide (27).

5. Resonator matrix according to claim 1, characterized in that the optical signals are coupled in via a single in-coupling waveguide (25) and are coupled out in wavelength-selective fashion via a plurality of out-coupling waveguides (26) which are optimally uncoupled from one another.

6. Resonator matrix according to claim 1, characterized in that the optical signals are coupled in via a plurality of in-coupling waveguides optimally uncoupled relative to one another and are coupled out via a single out-coupling waveguide.

7. Resonator matrix according to claim 1, characterized in that a broad band coupler is integrated on the same substrate, an additional wavelength band being capable of being coupled into an in-coupling waveguide (25) with the assistance thereof.

8. Resonator matrix according to claim 1, characterized in that all resonators of a level are either useful resonators or coupled resonators.

9. Resonator matrix according to claim 1, characterized in that the substrate is a semiconductor.

10. Resonator matrix according to claim 1, characterized in that the material of at least a part of the resonator matrix is glass-like.

11. Resonator matrix according to claim 9 characterized in that electronic circuits are additionally integrated on the semiconductor substrate.

12. Resonator matrix according to claim 1, characterized in that further optical elements are integrated on the substrate, including further spatially separated resonator matrices.

13. Resonator matrix according to claim 1, characterized in that at least one useful resonator is situated in the region of a pn-junction; and in that circuit means are provided which allow the properties of this useful resonator in the union of the resonator matrix to be made electrically accessible via the said pn-junction.

14. Resonator matrix according to claim 1, characterized in that the material of at least one useful resonator comprises no absorption or, respectively, as little absorption as possible.

15. Resonator matrix according to claim 1, characterized in that the material of at least one useful resonator comprises such an absorption as required for the effect of the absorption boost in a resonator.

16. Resonator matrix according to claim 1, characterized in that the material of at least one useful resonator is a laser-capable substance.

17. Resonator matrix according to claim 1, characterized in that the material of at least one part of the resonator matrix exhibits the electro-optical effect.

18. Resonator matrix according to claim 1, characterized in that the substrate material is silicon; and in that the waveguide core regions having elevated refractive index are composed of a mixture $Si_xGe_{1-x}$.

19. Resonator matrix according to claim 1, characterized in that connection electrodes belonging to useful resonators are connected such to one another that the electrical control signals for a plurality of resonators are applied to a common electrode.

20. Resonator matrix according to claim 1, characterized in that the reflectors (28, 29) of the individual resonators are combined to form a common mirror at respectively one end of the resonators.

21. Resonator matrix according to claim 1, characterized in that the resonators have mirrors at least at their respectively one end which are separated from the mirrors of the other resonators.

22. Resonator matrix according to claim 1, characterized in that the reflection faces (28, 29) of the resonators which reside opposite one another form two surfaces arranged at a slant relative to one another.

23. Resonator atrix according to claim 1, characterized in that the reflection faces (28, 29) of the resonators which reside opposite one another form two surfaces which are arranged as parallel as possible relative to one another.

24. Resonator matrix according to claim 1, characterized in that at least one resonator, in comparison to the other resonators, comprises a different form of the refractive index curve over the cross section.

25. Resonator matrix according to claim 1, characterized in that the waveguide side faces serving for light guidance are at least partially formed by surfaces (196) which have been produced by means of etching shafts.

26. Resonator matrix according to claim 1, characterized in that the waveguide side faces serving for light guidance are at least partially formed by surfaces (196) which have been produced by anisotropic etching of shafts.

27. The resonator matrix of claim 1, and further comprising:
means for beaming modulated and unmodulated characters into the resonator matrix.

28. The arrangement of claim 27, and further comprising:
a plurality of output lines and a plurality of electronically controlled crosspoints for distributing the electrical output signals selectively to said plurality of output lines.

29. The resonator matrix of claim 27, wherein:

said means comprises and in-coupling waveguide for beaming the modulated and unmodulated carriers into the coupled resonators from two different sides.

30. The arrangment of claim 27, wherein:
said means comprises a signle in-coupling waveguide (25) for distributing the light into different waveguides (26) in a wavelength-selective manner by way of the useful resonatiors (23).

31. The arrangement of claim 27, wherein:
said means comprises a plurality of different n-coupling wave-guides; and
an out coupling waveguide couples the light out of said arrangement.

32. The arrangement of claim 30, wherein:
a plurality of pn junctions are connected to receive electrical control signals for separating carriers modulated with information to various output lines.

33. The arrangment of claim 32, wherein:
at least one of the useful resonators comprises a characteristic such that its phase constant is controlled by a voltage applied to the appertaining pn junction, whereby the wavelength-selective modulation of the channel selected by the useful resonator occurs by way of electrical modulation signals.

34. The arrangement of claim 33, and further comprising:
co-integrated electrodes for varying the phase constant in response to a modulation voltage, whereby the wavelength-selective modulation of the channel selected occurs by way of electrical modulation signals.

35. The arrangement of claim 34, wherein:
at least one of said useful resonators is located in the region of a pn junction of a photodiode having a low absorption coeffcient for wavelength selective detection of radiation.

36. The arrangement of claim 34, wherein:
at least one useful resonator is located in the region of a pn junction of a diode having laser-capable material for separate amplification of the wavelengths received.

37. The manufacture of a resonator arrangement of optical resonators which are composed of dielectric waveguides which are mirrored at their ends predominantly with reflectors having reflection factors close to the value one and whose longitudinal extent between the reflectors is great in comparison to the transverse dimensions perpendicular thereto, in which all optical resonators are integrated on a substrate to form a matrix-like arrangement referred to as a resonator materix, being integrated such that two types of resonators can be distringuished, whereby the resonators of the first type are highly coupled to one another and act as coupled resonators, the resonators of the second type act as wavelength-selective useful resonators, and, in comparison to the couplings between the resonators of the first type are weakly coupled and form at least two useful resonator groups which are coupled to one another as little as possible, whereby a useful resonator group contains at least one useful resonator, comprising the step of:
applying a plurality of optical layers exhibiting different refraction for the reflectors of the individual resonators at at least one end.

38. Manufacture of a resonator matrix according to claim 37, characterized in that a plurality of planar layers having different refractive indices are applied by epitaxy.

39. Manufacture of a resonator matrix according to claim 37, characterized in that at least one waveguide core region (97) is produced in a shaft by means of epitaxy with materials having different refractive indices.

40. Manufacture of a resonator matrix according to claim 37, characterized in that at least one waveguide edge region arises in that shafts are filled with a material which exhibits a lower refractive index than the material of the waveguide core regions which are situated in the material between the shaft walls (196).

41. Manufacture of a resonator matrix according to claim 37, characterized in that at least one epitaxy step ensues by means of molecular beam epitaxy (MBE).

42. Manufacture of a resonator matrix according to claim 37, characterized in that holes (131) are etched, these comprising surfaces which are employed as end faces of the resonator matrix to be mirrored.

43. Manufacture of a resonator matrix according to claim 37, characterized in that an edge surface of the substrate is employed for the manufacture of at least one mirror.

44. Tuning of a resonator matrix of optical resonators which are composed of dielectric waveguides which are mirrored at their ends predominantly with reflectors having high reflection factors close to the value one and whose longitudinal extent between the reflectors is great in comparison to the transverse dimensions perpendicular thereto, in which all optical resonators are integrated on a substrate to form a resonator matrix, the resonators being integrated such taht two types of resonators can be distinguished, whereby the resonators of the first type are highly coupled to one another and act as coupled resonators, whereas the resonators of the second type act as wavelength selective useful resonators and, in comparison to the couplings between the resonators of the first type, are weakly coupled to form at lasy two useful resonator groups, whereby a useful resonator group contains at least one useful resonator, comprising the step of:
modifying the optical length of the resonators by controlling the temperature of thermo-electro elements.

45. Individual tuning of the individual resonators of a resonator matrix according to claim 44 characterized in that the effective refractive index ($n_{eff}$) of this resonator is controlled by means of injecting or extracting charge carriers by applying a variable electrical voltage to the appertaining pn-junction.

46. Individual tuning of the individual resonators of a resonator matrix according to claim 44, characterized in that, in at least one of the useful resonators, the refractive index and, thus, the phase constant of this useful resonator is controlled by means of the electrooptical effect, being controlled by means of a control voltage applied to co-integrated electrodes.

47. Tuning of a resonator matrix according to claim 44, wherein the step of modifying is further defined as: controlling the temperature of a piezo element.

48. Tuning of a resonator matrix according to claim 44, wherein the step of modifying is further defined as: controlling the temperature of a Peltier element.

* * * * *